United States Patent
Tanner et al.

(10) Patent No.: US 10,522,169 B2
(45) Date of Patent: Dec. 31, 2019

(54) CLASSIFICATION OF TEACHING BASED UPON SOUND AMPLITUDE

(71) Applicant: San Francisco State University, Long Beach, CA (US)

(72) Inventors: Kimberly Tanner, San Francisco, CA (US); Melinda T. Owens, San Mateo, CA (US); Jeffrey Schinske, San Francisco, CA (US); Mike Wong, San Francisco, CA (US); Shannon Seidel, Tacoma, WA (US)

(73) Assignee: TRUSTEES OF THE CALIFORNIA STATE UNIVERSITY, Long Beach, CA (US)

(*) Notice: Subject to any disclaimer, the term of this patent is extended or adjusted under 35 U.S.C. 154(b) by 0 days.

(21) Appl. No.: 15/699,794

(22) Filed: Sep. 8, 2017

(65) Prior Publication Data
US 2018/0090157 A1 Mar. 29, 2018

Related U.S. Application Data

(60) Provisional application No. 62/398,888, filed on Sep. 23, 2016.

(51) Int. Cl.
  *G10L 15/12* (2006.01)
  *G10L 25/78* (2013.01)
  (Continued)

(52) U.S. Cl.
  CPC ............. *G10L 25/78* (2013.01); *G09B 19/00* (2013.01); *G10L 25/21* (2013.01); *G10L 25/48* (2013.01); *G10L 21/10* (2013.01)

(58) Field of Classification Search
  CPC .......... G09B 19/06; G09B 5/06; G09B 15/04; G09B 17/006; G09B 15/003; G09B 19/04; G09B 5/04; G09B 5/062; G09B 7/02; G10L 15/08; G10L 15/10; G10L 15/12; G10L 15/142; G10L 15/16; G10L 15/32;
  (Continued)

(56) References Cited

U.S. PATENT DOCUMENTS 3,662,079 A * 5/1972 Schulz ................... G09B 15/04
                                                  84/471 R
4,363,118 A * 12/1982 Roach .................... G01B 11/22
                                                  250/559.46

(Continued)

OTHER PUBLICATIONS

"U.S. Appl. No. 12 879,218 Non Final Office Action dated Jun. 27, 2013", 12 pgs.

(Continued)

*Primary Examiner* — Vijay B Chawan
(74) *Attorney, Agent, or Firm* — Schwegman Lundberg & Woesner, P.A.

(57) ABSTRACT

A system is provided to determine teaching technique based upon sound amplitude comprising: processor; and a memory device holding an instruction set executable on the processor to cause the computer system to perform operations comprising: sampling amplitude of sound at a sampling rate; assigning a respective sound amplitude and a respective amplitude variation to the respective sound sample; and classifying the sound samples based upon the assigned sound amplitude and sound sample variation.

36 Claims, 21 Drawing Sheets
(7 of 21 Drawing Sheet(s) Filed in Color)

(51) Int. Cl.
*G09B 19/00* (2006.01)
*G10L 25/48* (2013.01)
*G10L 25/21* (2013.01)
*G10L 21/10* (2013.01)

(58) Field of Classification Search
CPC ......... G10L 17/26; G10L 21/04; G10L 25/30; G10L 25/51
USPC ....... 704/236, 254, 205, 230, 232, 238, 252, 704/265, 267, 268, 276; 434/185, 169, 434/156, 157, 167, 171, 172, 322
See application file for complete search history.

(56) References Cited

U.S. PATENT DOCUMENTS

| | | | | |
|---|---|---|---|---|
| 5,252,772 A * | 10/1993 | Wright | ...................... | G10G 3/04 84/18 |
| 5,362,240 A * | 11/1994 | Cave | ........................ | G09B 5/04 434/157 |
| 5,479,564 A * | 12/1995 | Vogten | .................... | G10L 21/04 704/265 |
| 5,596,679 A * | 1/1997 | Wang | ........................ | G10L 15/08 704/232 |
| 5,690,496 A * | 11/1997 | Kennedy | .............. | G09B 15/003 345/473 |
| 5,699,479 A * | 12/1997 | Allen | ...................... | H04B 1/665 375/241 |
| 5,893,058 A * | 4/1999 | Kosaka | ................... | G10L 15/12 704/254 |
| 5,906,492 A * | 5/1999 | Putterman | ............ | G09B 17/006 273/299 |
| 8,037,006 B2 * | 10/2011 | Yen | ......................... | G10L 17/26 706/16 |
| 8,958,586 B2 | 2/2015 | Preves | | |
| 9,495,591 B2 * | 11/2016 | Visser | ................ | G06K 9/00624 |
| 2002/0086268 A1 * | 7/2002 | Shpiro | ..................... | G09B 7/02 434/156 |
| 2005/0053900 A1 * | 3/2005 | Kaufmann | ............... | G09B 5/06 434/169 |
| 2006/0042632 A1 * | 3/2006 | Bishop | ................. | A61B 5/0836 128/207.18 |
| 2006/0256660 A1 * | 11/2006 | Berger | ...................... | G01S 5/20 367/124 |
| 2008/0027731 A1 * | 1/2008 | Shpiro | ..................... | G09B 5/06 704/276 |
| 2011/0137656 A1 | 6/2011 | Xiang et al. | | |
| 2016/0210988 A1 | 7/2016 | Lim et al. | | |

OTHER PUBLICATIONS

Tanner, Kimberly, "Data processing system with decibel analysis for research in teaching", 29 pgs, Same as U.S. Appl. No. 62/398,888, filed Sep. 23, 2016.

* cited by examiner

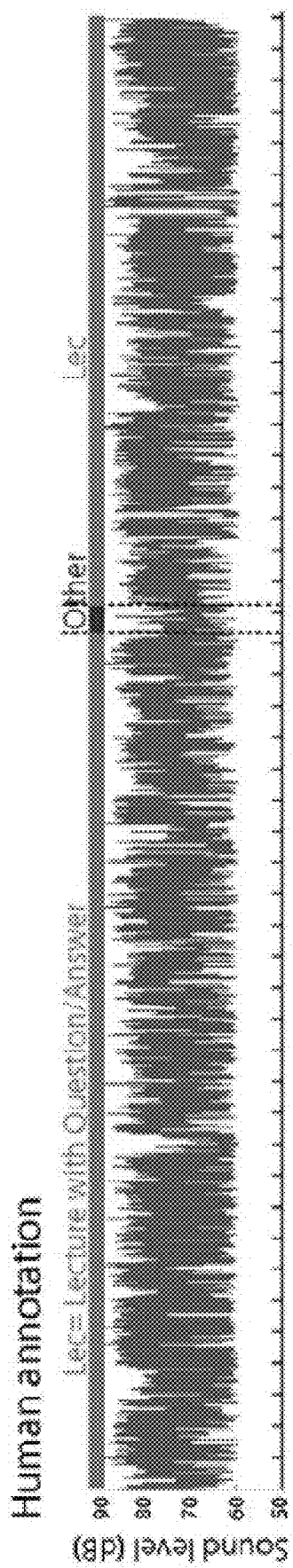
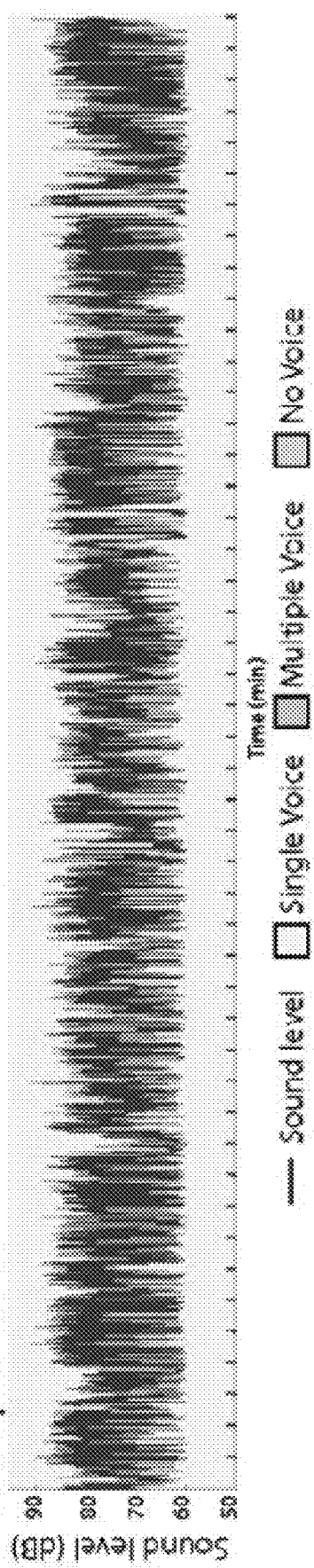
Fig. 6A
Fig. 6B

| | INSTRUCTORS | COURSES | CLASS SESSIONS | RECORDED HOURS (HR) |
|---|---|---|---|---|
| PILOT GROUP: COMMUNITY COLLEGE | 8 | 8 | 45 | 65 |
| LARGE-SCALE ANALYSIS: COMMUNITY COLLEGE | 27 | 35 | 712 | 970 |
| LARGE-SCALE ANALYSIS: 4-YEAR UNIVERSITY | 22 | 32 | 774 | 750 |
| LARGE-SCALE ANALYSIS: ALL | 49 | 66 | 1486 | 1720 |

Fig. 13

CLASSIFICATION OF TEACHING BASED UPON SOUND AMPLITUDE

PRIORITY

This application claims the benefit of priority of U.S. Patent Application Ser. No. 62/398,888, filed on Sep. 23, 2016, which is hereby incorporated by reference herein in its entirety

STATEMENT REGARDING FEDERALLY SPONSORED RESEARCH OR DEVELOPMENT

This invention was made with government support under DUE-1226361 and DUE-1226344, awarded by the National Science Foundation. The government has certain rights in the invention.

BACKGROUND

The content of classroom teaching and teaching style used to deliver the content are not the same. The same classroom content can be delivered with different learning styles, e.g., lecturing versus active learning. Active learning techniques can boost student achievement. STEM (science, technology, engineering, and math) education continues to struggle to engage, effectively teach, and retain post-secondary students, both generally and particularly among women and students of color. Some analyses suggest that increasing retention by just ten percent of undergraduate STEM students could address anticipated STEM workforce shortfalls. Attempts to reform undergraduate STEM education to use more active teaching strategies that have been shown to increase retention have been on-going for decades, with hundreds of millions of dollars invested by national and federal agencies. Even for those students retained in STEM, growing evidence from discipline-based education researchers and others suggest widespread ineffectiveness of current university teaching practices in promoting learning. In contrast, active learning pedagogies of varying quality have been repeatedly demonstrated to produce superior learning gains with large effect sizes compared to lecture-based pedagogies. Shifting large numbers of STEM faculty to include any active learning in their teaching may retain and more effectively educate far more students than having a few faculty completely transform their teaching.

Approaches to evaluate learning techniques have included in-person observation and video recordings. These approaches can be intrusive, however. The presence of an observer or video recorder in a classroom can have the effect of causing a teacher to alter his or her style of teaching. Moreover, teaching style may vary from one class session to the next depending upon the subject matter being taught, and therefore, making just a few observations may not provide an accurate assessment of learning style used in the class. However, sending an observer to every class or filming every class can be expensive and time consuming. Films of a class typically must be reviewed eventually by a human observer.

Transcription of audio recordings of classroom content, e.g., the words that are spoken, does not necessarily reveal teaching style since the words spoken do not necessarily reveal the level of active participation by students. Moreover, if done manually by human observers, evaluation of audio recordings to assess the amount of active learning can be time consuming and expensive. Thus, there has been a need for improvement in techniques to evaluate classroom learning techniques.

SUMMARY

In one aspect, a system that includes a processor and a memory device is provided to determine teaching technique based upon sound amplitude. The memory device holds an instruction set executable on the processor to cause the computer system to perform operations that include storing in a storage memory device, a sequence of detected sound amplitude values representing sound amplitude emanating from a learning session during a corresponding sequence of time intervals. The operations include producing a sequence of respective sound samples corresponding to the sequence of detected amplitude values. Producing the sound samples includes determining respective normalized sound amplitude values based upon respective detected sound amplitude values corresponding to respective time intervals within respective time windows. Each respective time window has a prescribed number of time intervals and each respective time window encompasses a different collection of successive time intervals from the sequence of time intervals. Producing also includes determining respective variation values corresponding to respective sound amplitude values based upon respective sound amplitude values corresponding to respective time intervals within respective time windows. The operations also include classifying respective sound samples of the sequence of sound samples based upon the respective normalized stored amplitudes and the respective variation values of stored amplitude values.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals and/or letters in the various examples. This repetition is for the purpose of simplicity and clarity and does not in itself dictate a relationship between the various embodiments and/or configurations discussed. Like-numbered elements refer to common components in the different figures.

FIGS. 6A-6G are example screen displays that may be produced by the display device showing chart displays indicating amplitude samples aligned with sampling session timelines annotated with sound sample classifications in accordance with some embodiments.

FIG. 13 is an illustrative table describing DART study participants.

DESCRIPTION OF EMBODIMENTS

System to Classify Teaching Based Upon Classroom Sound Amplitude

Figure 1:
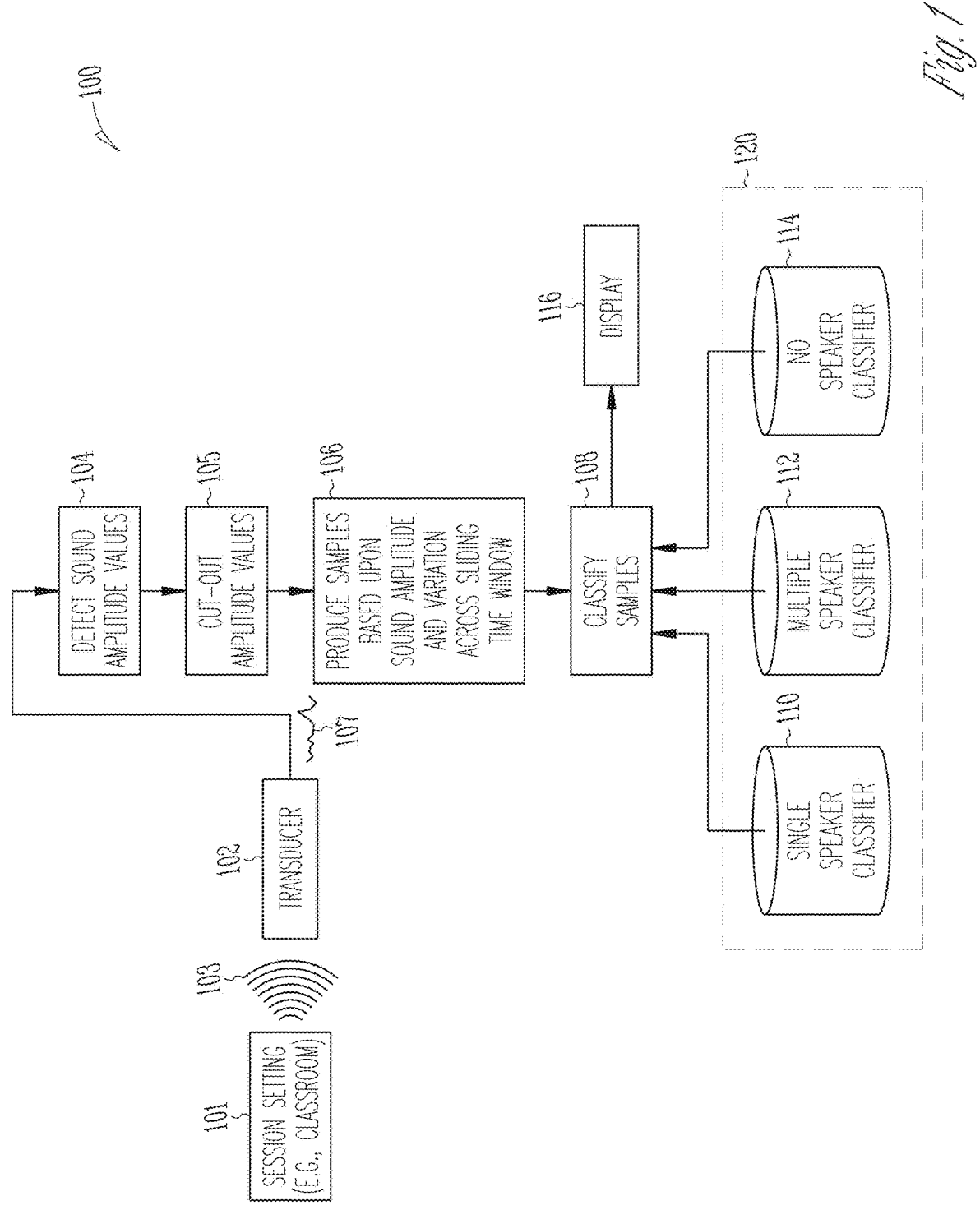
FIG. 1 is an illustrative block diagram representing architecture of a system to classify sounds in accordance with some embodiments.

FIG. 1 is an illustrative block diagram representing architecture of a system 100 to classify sounds in accordance with some embodiments. The system 100 applies DART (Decibel Analysis for Research in Teaching) to quantify time spent on teaching activities in a session setting 103. The system 100 includes a sound transducer block that includes a sound transducer 102, such as a microphone, that detects ambient sound 101 emanating from a session setting 103 and converts the detected sounds into one or more electrical signals 107 having amplitude values indicative of sound amplitude during the session. In some embodiments, the transducer 102 converts the detected sound 103 to an electrical signal 107 having a contemporaneous amplitude indicative of the contemporaneous amplitude or loudness of the sound emanating from the session. The transducer 102 may be located in a classroom setting, for example, to convert sound 103 produced within the classroom during a sampling session, such as a classroom instructional session.

A detector block 104 detects from the one or more electrical signals 107, a sequence of detected sound amplitude sample values representing sound emanating from the session at a sequence of time intervals. In some embodiments, the detected sound amplification values are collected at a sampling rate that is low enough to anonymize the sound represented by the detected sound amplification sample values. In other words, the sampling rate is low enough to not record the details of human speech, such as individual words, so that individual voices cannot be recognized based upon the samples. In some embodiments, the sampling rate is 2 Hz, one sample per 0.5 second.

A first pre-processing block 105 clips out detected sound amplification values at the beginning and end of a sampling session. A sample session time interval may extend for an entire classroom teaching interval, which sometimes may extend for one or more hours, for example. Sounds recorded at the beginning and at the end of a classroom teaching session, for example, may not be indicative of the teaching style used during the actual classroom teaching, but rather, may include sounds indicative of students arriving to take their seats before class or departing after class. Accordingly, detected sound amplification values corresponding to sequential time intervals at the beginning and at the end of a sample session data sequence may be omitted from further processing.

A second pre-processing block 106 produces samples over a sliding time window and normalizes the samples based upon overall sound level during an entire sampling session. The sliding time window defines a sequence of detected sound amplitude values to use to produce a sound sample corresponding to a currently selected detected sound amplitude value that is centered within the sliding time window. In some embodiments, the sliding timeline window has a 15 second duration, and the sequence of detected sound amplitude values used to determine a sample value for a time interval at the center of the window includes detected sound amplitude values corresponding to sampling times within 7.5 seconds before and after a sample currently at the center of the sliding time window. The smoothing reduces the impact of anomalous sounds such as the sound of a cough during a lecture, for example. Different sampling sessions may occur in different sampling settings. For example, different classroom lectures may take place in classrooms having different physical sizes and different numbers of students, which may result in different overall sound levels. Normalizing samples based upon overall sound levels allows for comparison of samples from different session settings.

A classifier block 108 classifies samples based upon single voice classifier 110, multiple voice classifier 112 and no voice classifier 114. The classifiers 110-114 may be developed based upon machine learning, for example. In some embodiments, the classifiers 110, 112, 114 may located at a server, indicated by dashed lines 120 accessible over a network (not shown). In some embodiments, the classifiers classify samples based upon sound volume levels and sound volume variation levels. The inventors have found that a combination of sound amplitude and variation parameters in sound amplitude within a sampling window is indicative of certain events within a classroom session. Specifically, for example, a sample associated with a moderate level amplitude and a high variability of amplitude is indicative of a single voice. Single Voice is generally indicative of non-active teaching strategies given that only a single active voice was heard with all other individuals passively listening. A sample associated with a high amplitude and a low variability of amplitude is indicative of multiple voices. Multiple Voice samples are characterized by many people speaking simultaneously (e.g. pair discussions). A sample associated with a low amplitude and a low variability of amplitude is indicative of no voice. No Voice samples are characterized by quiet throughout the classroom (e.g. silent writing). Multiple and No Voice generally indicate active learning because many or all students were actively engaged in a task.

A display block 116 is configured to display a chart showing a sampling session timeline annotated with sound sample classifications. Different classroom activities during different sample increments during a sampling session may result in sounds that are differently classified. The chart provides a visual indication of the distribution of classifications that can be used to evaluate the proportion of active learning occurring during the sampling session, for example.

Figure 2:
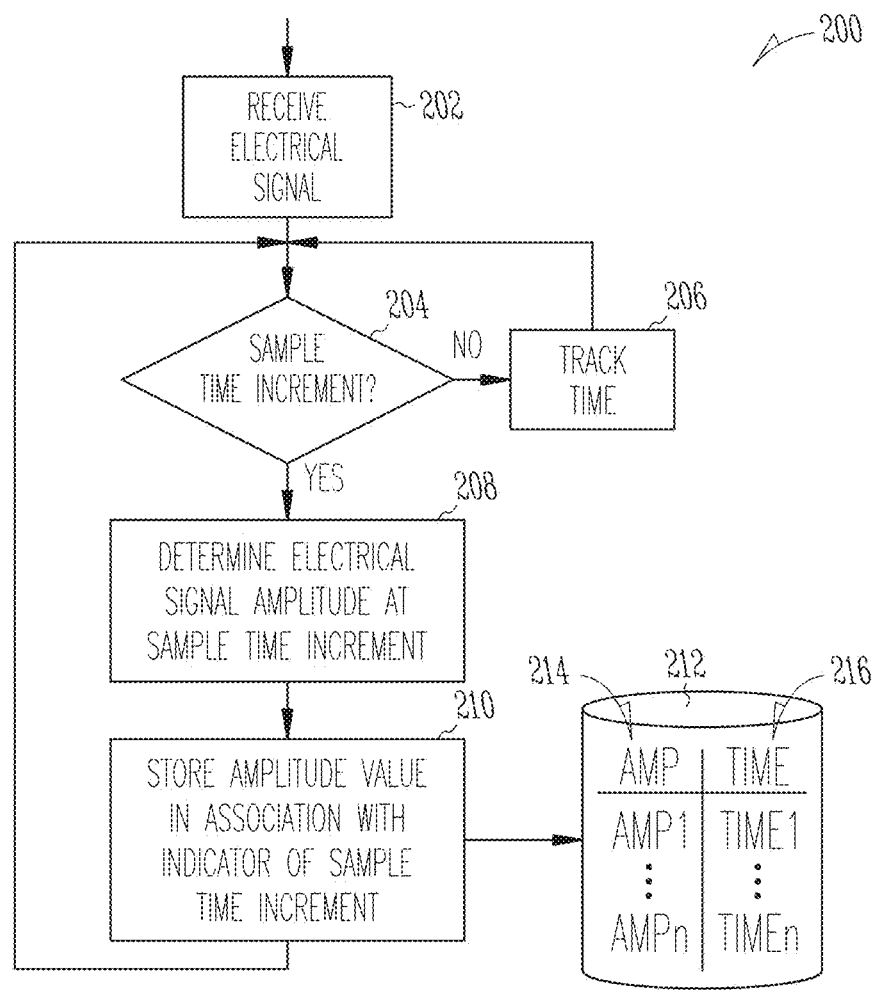
FIG. 2 is an illustrative flow diagram indicating a sampling process in accordance with some embodiments.

FIG. 2 is an illustrative flow diagram indicating a sampling process 200 to perform sampling by sampling block 104 in accordance with some embodiments. Computer program code may configure the computer system 1100 of FIG. 14 to implement the process 200 by signal detector block 104. Module 202 receives the electrical signal produced by the transducer 102. Decision module 204 determines whether an arrival time of a sequential time increment has occurred in which to take a next sequential sample of the electrical signal. Time tracking module 206 tracks time between arrival times of sequential time increments. In some embodiments, module 204 determines an arrival time of a sequential time increment at 0.5 second time increments, i.e. at a sample rate of 2.0 Hz. In response to an occurrence of an arrival time of a next sequential time increment, module 208 determines amplitude of the received electrical signal at the currently arrived sequential time increment. Module 210 stores the determined amplitude value in a memory storage device 212 in association with an indication of the sequential sample time increment in which the value is determined. Thus, the process 200 stores in the storage memory device 212 a sequence of amplitude sample values 214 associated with a sequence of time increments 216.

In an alternative embodiment, the transducer 102 may be configured to convert sound to electrical samples at the sample rate. In such alternative embodiment (not shown), the decision module 204 and track time 206 may be configured to control sampling generation by the transducer 102. In such alternative embodiment (not shown), module 208 determines electrical signal amplitude of samples produced by the transducer 102 at sequential sample time increments.

Figure 3:
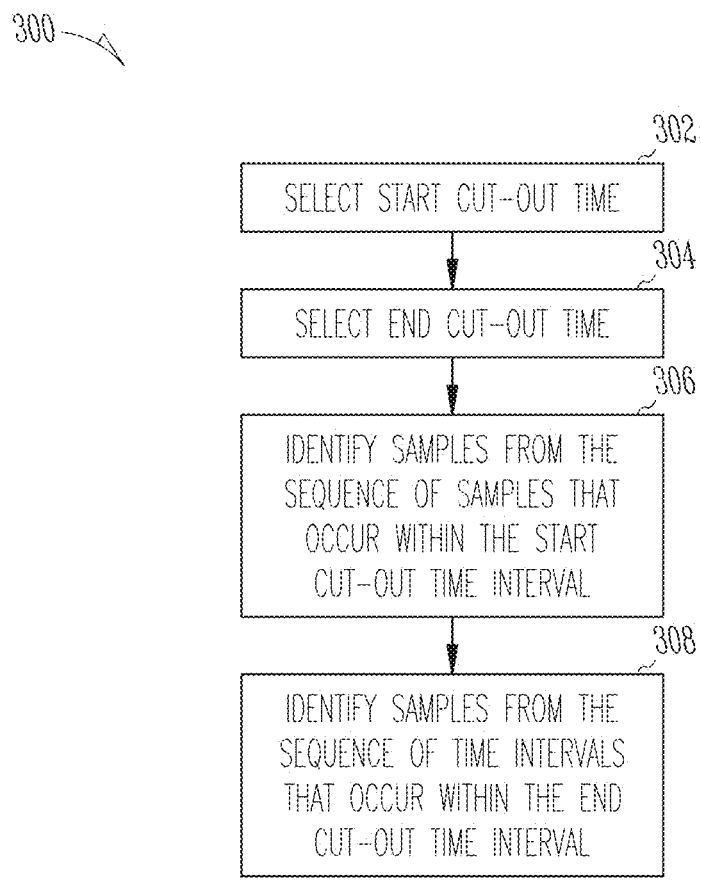
FIG. 3 is an illustrative flow diagram indicating a sample cut-out process in accordance with some embodiments.

FIG. 3 is an illustrative flow diagram indicating a sample cut-out process 300 in accordance with some embodiments. Computer program code may configure the computer system 1100 of FIG. 14 to implement the process 300 by the sample cut-out block 105. Module 302 selects a cut-out time interval at the start of a sample sequence. Module 304 selects a cut-out time interval at the end of a sample sequence. The start and end time intervals may have pre-selected durations or may be user selected. Module 306 identifies a range of samples within a sample sequence that occur within the start cut-out time interval. Module 308 identifies a range of samples within a sample sequence that occur within the end cut-out time interval. Samples within the start or end cut-out time intervals may be omitted from consideration in further processing and classification since they may be more indicative of events before or after a sampling session but not during the actual session.

Figure 4A:
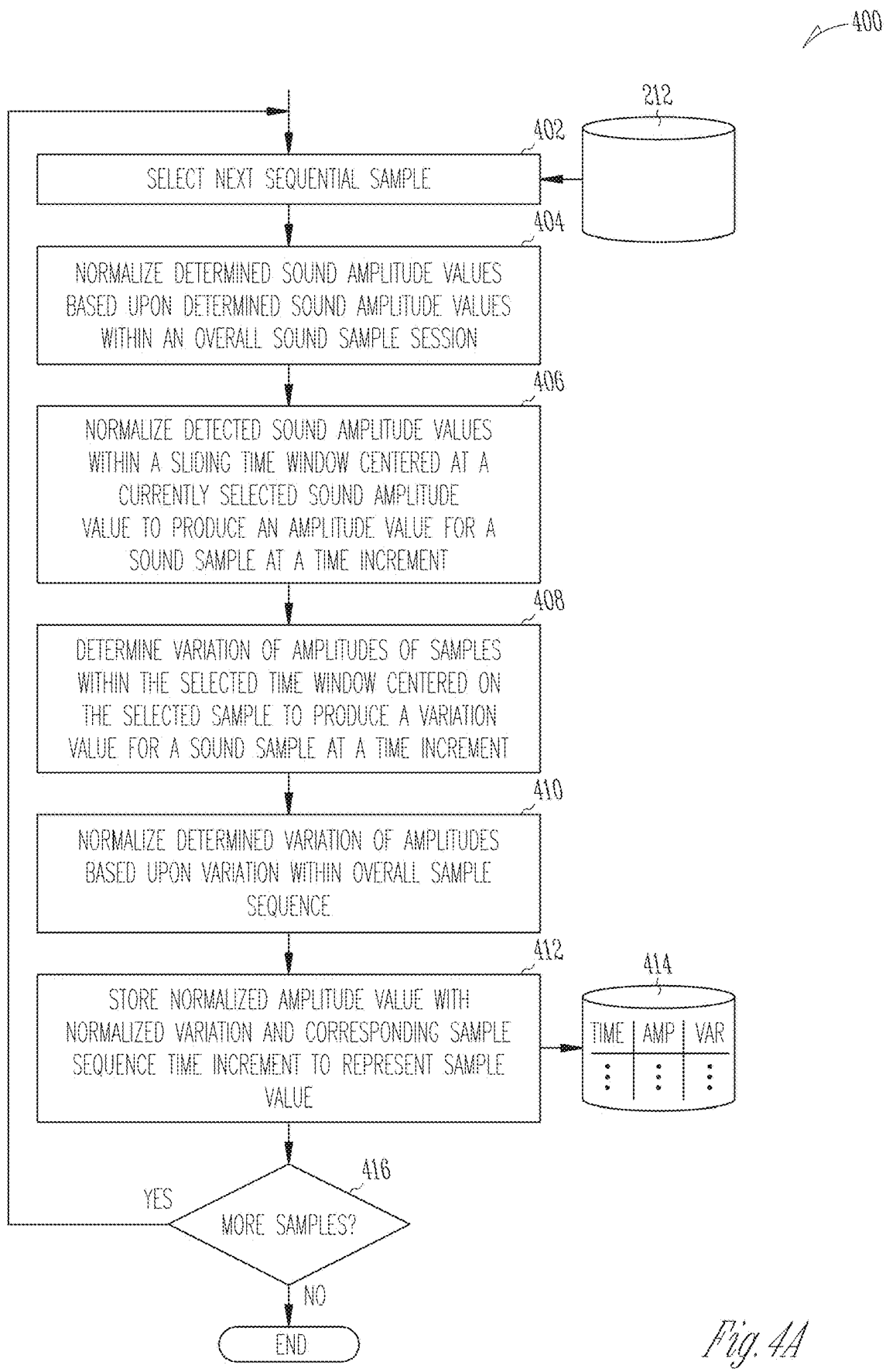
FIG. 4A is an illustrative flow diagram indicating a sound sample producing process in accordance with some embodiments.

FIG. 4A is an illustrative flow diagram indicating a sound sample producing process 400 in accordance with some embodiments. Computer program code may configure the computer system 1100 of FIG. 14 to implement the processes 400 by the sample producing block 106. Module 402 selects a current sequential detected sound amplitude value from the memory storage device 212. Over the course of determining multiple sound samples, module 402 selects a sequence of detected sound sample values at a corresponding sequence of time intervals in time interval sequence order.

Module 404 normalizes a currently selected detected sound sample value over an overall sampling session based upon an average amplitude of all samples within the overall session's sample sequence. In some embodiments, normalization involves arranging distribution of sound amplitude values in accordance with a Gaussian (i.e. the normal) distribution. Detected sound sample values that are cut-out are not included in the amplitude normalization determination. In some embodiments, a normalized amplitude of a currently selected sample is determined based upon a z-score computation in which a normalized amplitude of the sample is:

$$\text{Normalized Amplitude}[i] = A[i] - \text{mean}(A))/\text{stdev}(A)$$

where $A[i]$=amplitude of the selected detected sound amplitude i; $\text{mean}(A)$=mean amplitude for an entire sequence of detected sound amplitudes; and $\text{stdev}(A)$=standard deviation of the amplitude for the entire sequence of detected sound amplitudes.

Figure 4B:
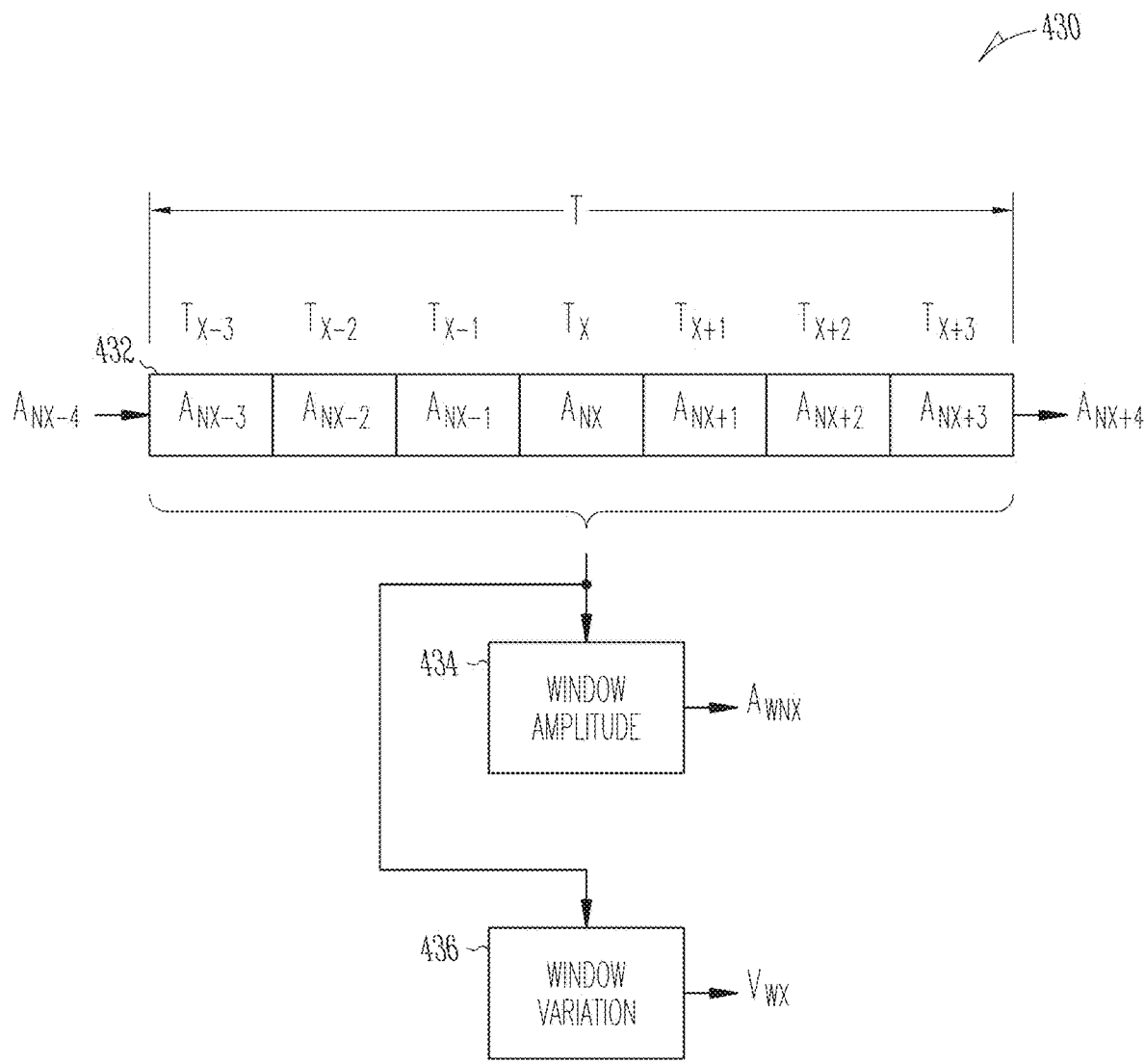
FIG. 4B is an illustrative example functional flow diagram representing sliding window normalization of amplitude and sliding window normalization of variation of the sound sample producing process of FIG. 4A in accordance with some embodiments.

Module 406 represents a sliding window normalization process in which a sound amplitude value is assigned for a currently selected detected sound amplitude value based upon detected sound amplitude values surrounding it. FIG. 4B is an illustrative example functional flow diagram 430 representing the sliding window normalization process of module 404. The functional flow diagram 430 includes an illustrative example FIFO storage device 432, a sliding window amplitude normalization computation block 434, and a sliding window variation computation block 436. The illustrative example FIFO storage device 432 includes seven example storage locations. The illustrative example FIFO device 432 implements a sliding time window T having an example window time width consisting of seven sequential time intervals, $t_{x-3}$ to $t_{x+3}$ centered at time interval $t_x$. FIG. 4B shows an illustrative example in which the FIFO storage device 432 currently stores detected sound sample values $A_{Nx-3}$ to $A_{Nx+3}$ corresponding to time intervals $t_{x-3}$ to $t_{x+3}$ have been shifted from left to right into the FIFO 432, with a currently selected sound sample value $A_{Nx}$, corresponding to time interval $t_x$, stored at a center storage location. The normalization computation block 434 assigns a sound amplitude $A_{Nwx}$ value corresponding to the currently selected detected sound amplitude value $A_{Nx}$ based upon sequential detected sound amplitude values $A_{Nx-3}$ to $A_{Nx+3}$ that straddle the currently selected sound amplitude value $A_{Nx}$. In some embodiments, the block 434 performs an averaging of the currently stored values $A_{Nx-3}$ to $A_{Nx+3}$ to determine $A_{Nwx}$. In other embodiments, the block 434 performs a summing of the currently stored values $A_{Nx-3}$ to $A_{Nx+3}$ to determine $A_{NWx}$.

In an alternative embodiment, samples are normalized over a session after being normalized over a window. More particularly, module 404 assigns a sound amplitude value to a sample corresponding to a time interval corresponding based upon a currently selected non-normalized detected sound amplitude value that corresponds to that same time interval and surrounding non-normalized detected sound sample values. Module 408 then normalizes the assigned sound amplitude values over the session, subject to cut-outs.

Referring again to FIG. 4A, module 408 determines variation of detected sound value amplitudes within the sliding time window. Referring back to FIG. 4B, sliding window variation computation block 436 assigns a variation value corresponding to a currently selected sequential time interval. In the example of FIG. 4B, a variation $V_{W_x}$ is assigned based upon variation of values $A_{Nx-5}$ to $A_{Nx+5}$. In some embodiments, the variation includes a standard deviation.

In some embodiments, the time duration of the sliding window, and therefore, the number of samples within the sliding window, is determined based upon the shortest expected duration of a multiple speaker event. For example, in some classroom settings, an instructor may skillfully manage a classroom to keep pairwise discussion as short as 15 seconds. Thus, a sliding time window is long enough so that the act of smoothing does not corrupt sampling information indicative of a short multi-speaker event.

Module 410 normalizes the variation for the currently selected detected sound amplitude value based upon variation of all detected sound amplitude value within an overall sample sequence. Different sample session settings have different average amplitude levels due to differences in physical scenes, e.g., room dimensions, and the number of speakers, e.g., class size. Overall normalization of detected sound amplitude amplitudes and of detected sound amplitude amplitudes variations normalizes samples for factors such as these. Samples that are cut-out are not included in the overall normalization determinations. In some embodiments, a normalized standard deviation of a currently selected sample is determined as a localized standard deviation (LSD) as a standard deviation of a sample window of a predetermined size in which the normalized standard deviation is, Normalized Standard Deviation=LSD[i]−mean(LSD)/ stdev(LSD)

Where LSD[i]=LSD where the window is centered around the selected sample I; mean(LSD)=mean LSDs across all windows in the entire sample sequence; stdev (LSD)=standard deviation of the LSDs across all windows in the entire sample sequence.

Module 412 stores in a storage memory device 414, the normalized average sample amplitude assigned for a currently selected detected sound amplitude value in association with the normalized variation assigned to the currently selected detected sound amplitude value together with an indication of the sample time increment associated with the current sample. Decision module 416 determines whether there are more samples to be smoothed and normalized in memory storage device 212. If yes, the control flows back to module 402. If no, the process ends.

Figure 5:
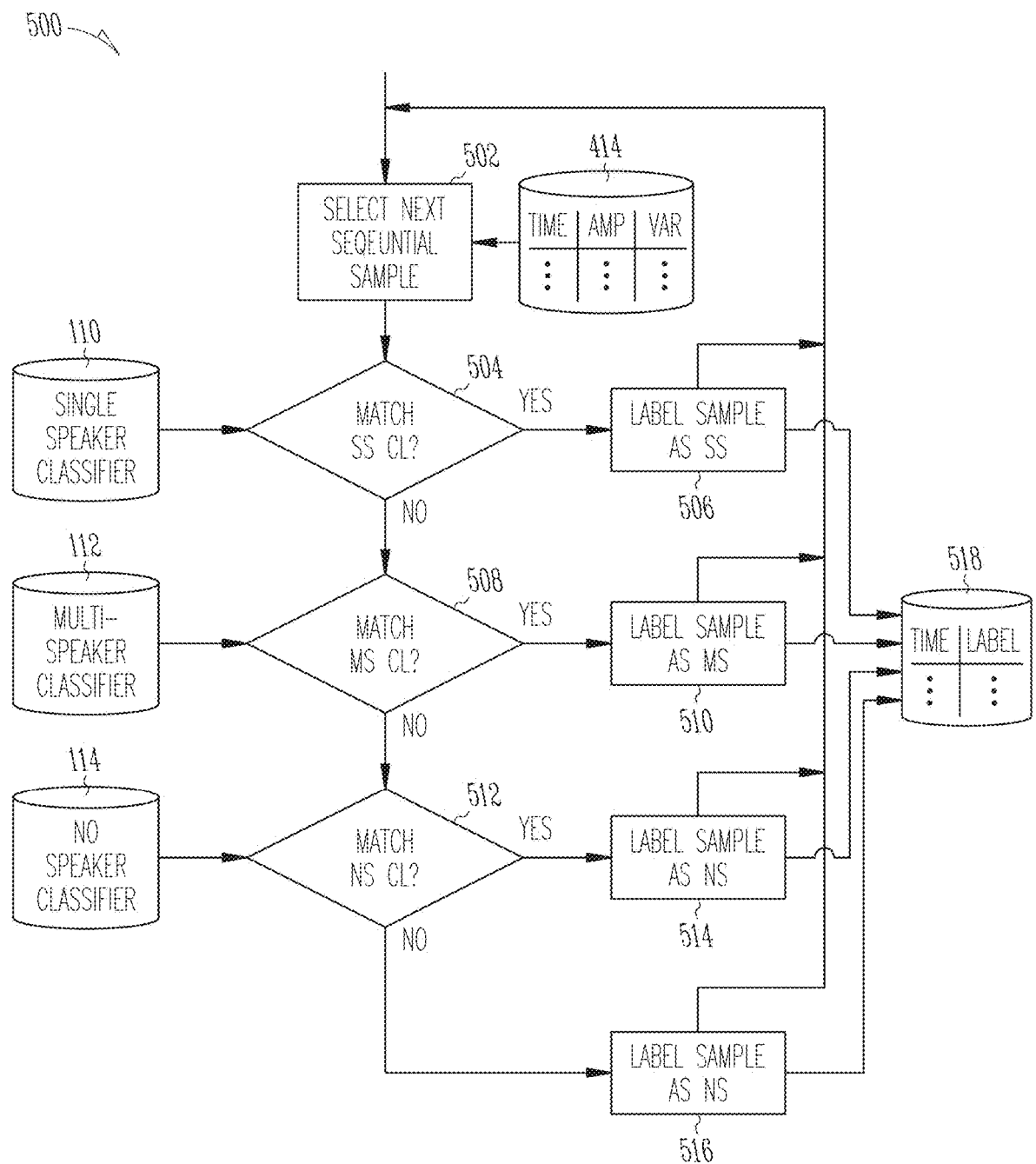
FIG. 5 is an illustrative flow diagram indicating a sample classification processes in accordance with some embodiments.

FIG. 5 is an illustrative flow diagram indicating a sample classification processes 500 in accordance with some embodiments. Computer program code may configure the computer system 1100 of FIG. 14 to implement the processes 500 by the classifier block 108. In some embodiments, the single speaker, multiple speaker and no speaker classifiers 110, 112, 114 each includes a lookup table containing multiple combinations of amplitude values and variation values that fall within the scope of the classifier. Module 502 selects a current sequential sample form the memory storage device 414. Single speaker decision module 504 determines whether an (amplitude, variation) combination assigned to a currently selected sample matches an (amplitude, variation) combinations indicated by the single speaker classifier 110. Moreover, in some embodiments, decision module 504 determines determined whether the (amplitude, variation) combination assigned to a currently selected sample is within a range of (amplitude, variation) combinations determined based upon the combinations of amplitude values and variation values within the single speaker classifier 110. If decision module 506 determines that the currently selected sample has an (amplitude, variation) combination that matches (amplitude, variation) parameters of the single speaker classifier 110, then module 506 stores a single speaker label in association with an indication of the sequential time increment corresponding to the currently selected sample in a memory storage device 518.

If decision module 506 determines that the currently selected sample does not have an (amplitude, variation) combination that matches the single speaker requirements, then multiple speaker decision module 508 determines the (amplitude, variation) combination assigned to a currently selected sample matches an (amplitude, variation) combinations indicated by the multiple speaker classifier 112 or is within a range of (amplitude, variation) combinations determined based upon the combinations of amplitude values and variation values within the multiple speaker classifier 112. If decision module 508 determines that the currently selected sample has an (amplitude, variation) combination that matches the (amplitude, variation) parameters of the multiple speaker classifier 112, then module 510 stores a multiple speaker label in association with an indication of the sequential time increment corresponding to the currently selected sample in the memory storage device 518.

If decision module 508 determines that the currently selected sample does not have an (amplitude, variation) combination that matches the multiple speaker requirements, then no speaker decision module 512 determines the (amplitude, variation) combination assigned to a currently selected sample matches an (amplitude, variation) combinations indicated by the no speaker classifier 114 or is within a range of (amplitude, variation) combinations determined based upon the combinations of amplitude values and variation values within the no speaker classifier 114. If decision module 512 determines that the currently selected sample has an (amplitude, variation) combination that matches the (amplitude, variation) parameters of the no speaker classifier 114, then module 514 stores a no speaker label in association with an indication of the sequential time increment corresponding to the currently selected sample in the memory storage device 518. If decision module 512 determines that the currently selected sample does not have an (amplitude, variation) combination that matches the no speaker requirements, then then module 516 stores an other label in association with an indication of the sequential time increment corresponding to the currently selected sample in the memory storage device 518. Control flows back to module 502.

Thus, in accordance with some embodiments, the classifier block 108 according to the process 500, classifies learning technique solely based upon sound samples that do not contain details of human speech. The sound samples include sound amplitude and sound variation information. Single voice classification, multiple voice classification, and no voice classification have different ranges of amplitude and amplitude variation. The classifier block 108 classifies a sample based upon whether its amplitude and amplitude variation fit within the single voice, multiple voice, or no voice classification ranges.

Display of Sample Session Teaching Activity Predictions

FIGS. 6A-6G are example screen displays that may be produced by the display device 116 showing charts indicating amplitude samples aligned with sampling session timelines annotated with sound sample classifications in accordance with some embodiments.

The example smoothed and normalized sample sound levels were over time at 2 Hz, with each tickmark in the charts indicating 2 minutes. FIG. 6A is an illustrative chart display that indicates sound samples from an approximately 94-minute class annotated with human annotation codes indicating that the class was all lecture with some question and answer. FIG. 6B is an illustrative chart display that indicates with background shading a prediction using the system of FIG. 1 that the class content of FIG. 6A is all single voice. Thus, the human annotation of the chart in FIG. 6A matches the predicted content of the chart of FIG. 6B.

Figure 6C:
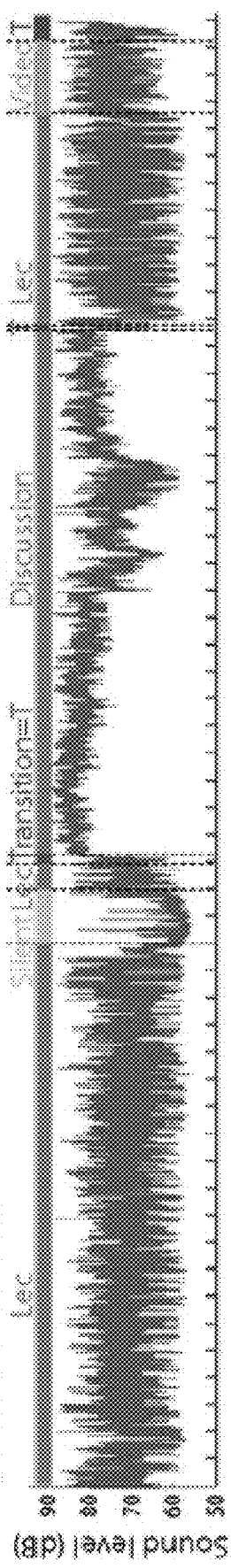
Figure 6D:
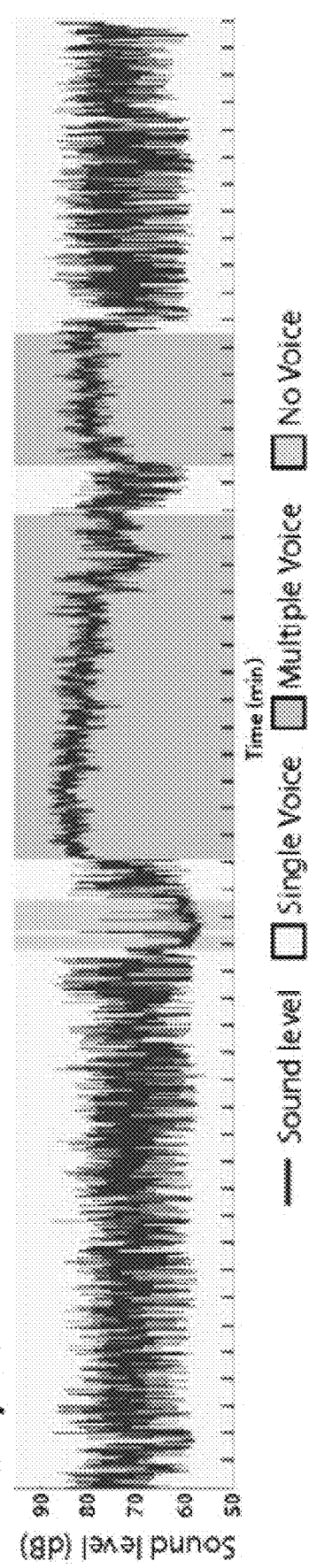

FIG. 6C is an illustrative chart display that indicates sound samples from an approximately 108-minute class annotated with human annotation codes indicating varied learning activities. FIG. 6D is an illustrative chart display that indicates with background shading a prediction using the system of FIG. 1 that of the class content of FIG. 6C is a combination of single voice, multiple voice and no voice at different time intervals during the sampling session. Thus, the human annotation of the chart in FIG. 6A matches the predicted content of the chart of FIG. 6B. The human annotation of the chart in FIG. 6C generally matches the predicted content of the chart of FIG. 6C.

Figure 6E:
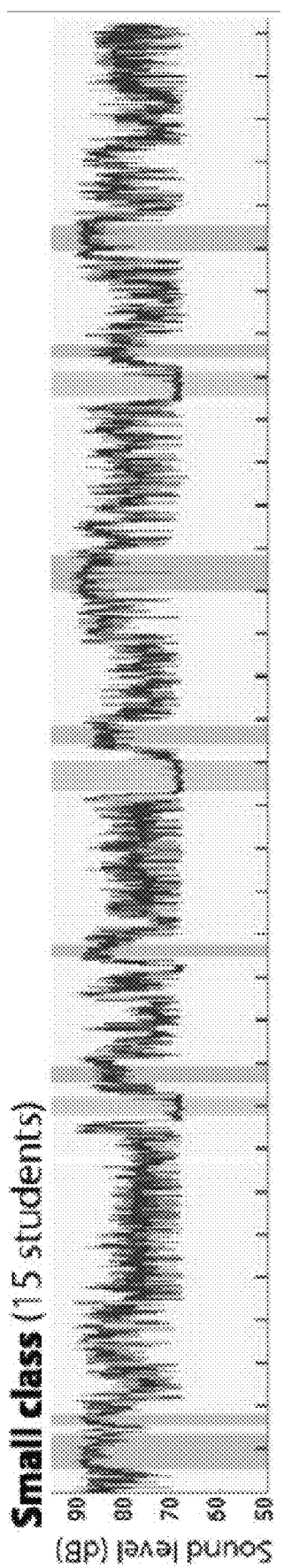
Figure 6F:
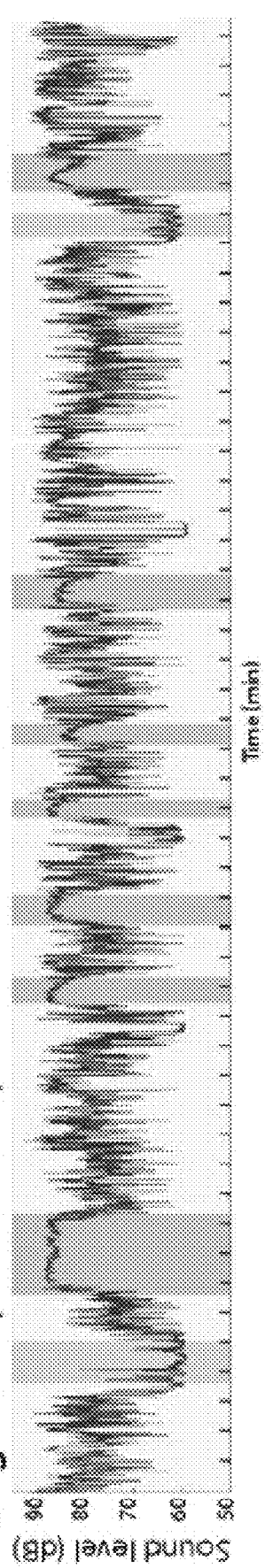
Figure 6C:
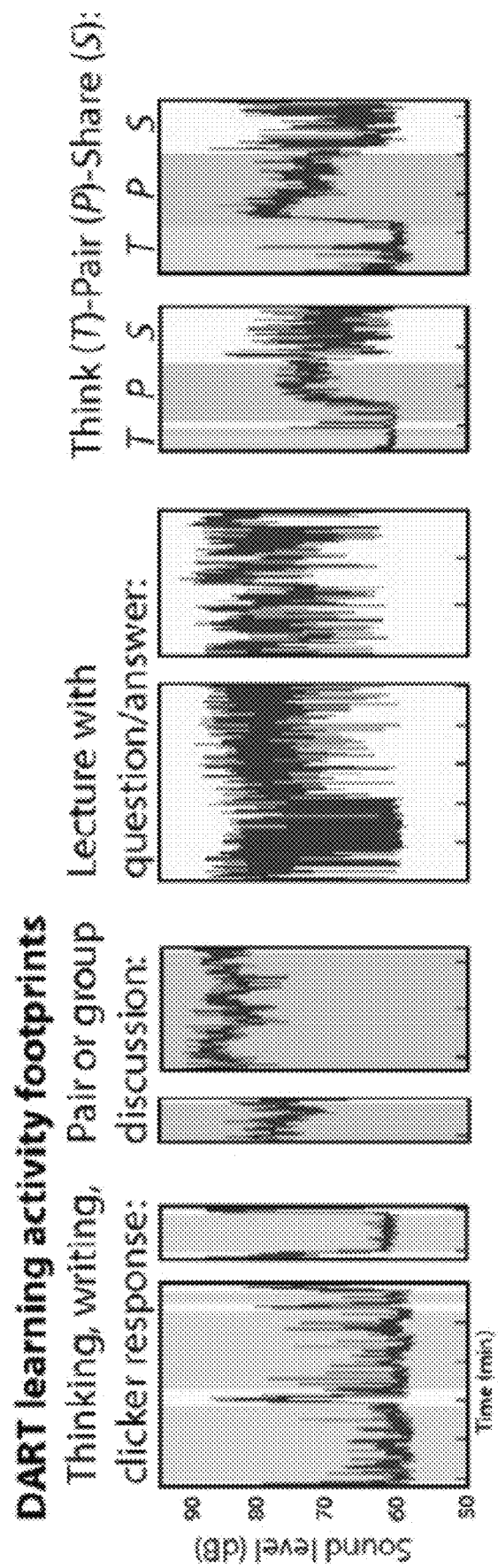

FIG. 6E is an illustrative chart display that indicates with background shading that sound samples from a small class (n=15 students; 98 minutes) include a combination of single voice, multiple voice and no voice at different time intervals during the sampling session. FIG. 6F is an illustrative chart display that indicates with background shading that sound samples from a large class (n=287 students; 49 minutes) includes a combination of single voice, multiple voice and no voice at different time intervals during the sampling session. A larger class often has a higher average sound level than a smaller class, but normalization of sample amplitudes as between the samples from the two different sized classes permits accurate prediction based upon a common set of classifiers 110, 112, 114.

FIG. 6G1-Figure G4 shows four chart display segments indicating example sample activity footprints from different class sessions. The background shading over the sample pattern in FIG. 6G1 represents thinking, writing, or clicker responses. The background shading over the sample pattern in FIG. 6G2 represents pair or group discussion. The background shading over the sample pattern in FIG. 6G3 represents lecture with question and answer. The background shading over the sample pattern in FIG. 6G4 represents think (T), pair (P), share (S).

Machine Learning to Develop Classifiers

Figure 7:
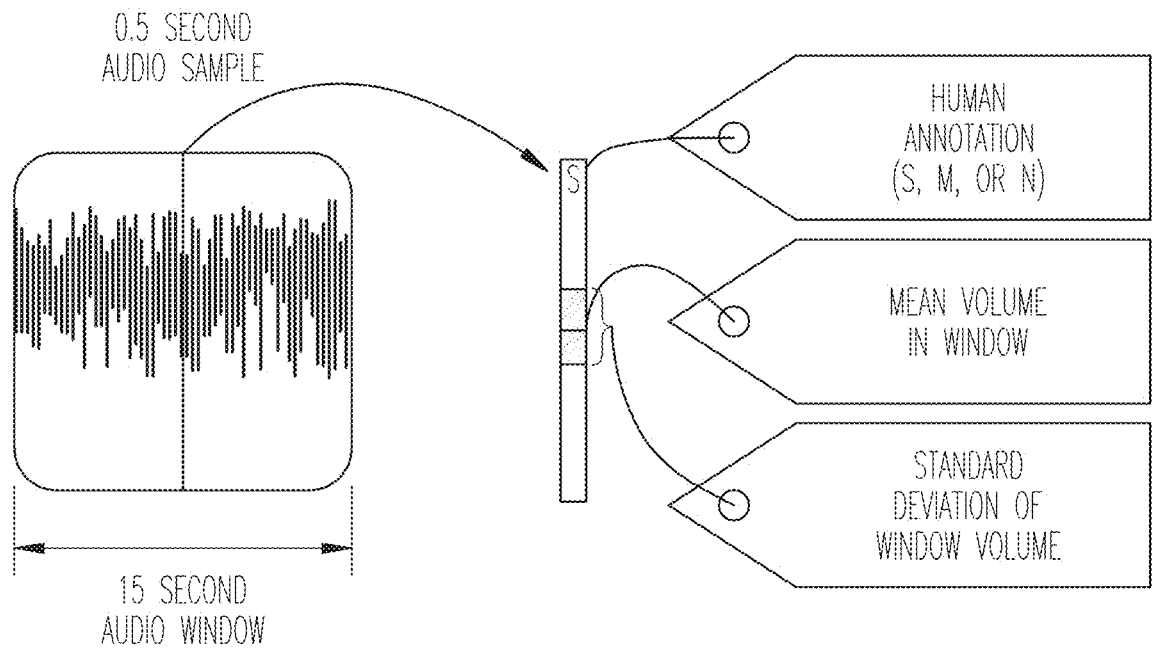
FIG. 7 is an illustrative drawing showing a sound sample within a sliding sample window in accordance with some embodiments in accordance with some embodiments.
Figure 8:
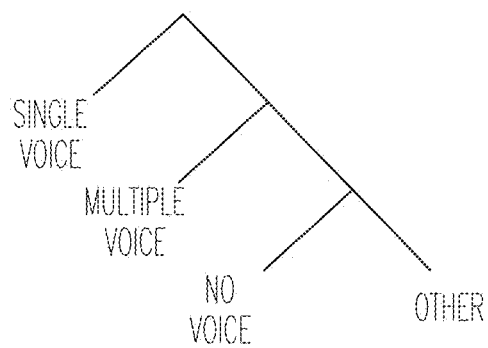
FIG. 8 is an illustrative drawing representing an ensemble of binary decision trees used to classify classroom audio recordings in accordance with some embodiments.

FIGS. 7-10 are illustrative drawings representing a machine learning process to develop the single voice, multiple voice and no voice classifiers 110, 112, 114 in accordance with some embodiments. FIG. 7 is an illustrative drawing shows a sound sample within a sliding sample window in accordance with some embodiments. Samples are recorded at 0.5 second intervals and may be tagged with (i) its label from a human annotation (S for Single Voice, M for Multiple Voice, or N for No Voice), (ii) the mean volume of the 15 second window of audio around it, and (iii) the standard deviation (std) in that window's volume. Mean volume and standard deviation are normalized with respect to their class session. FIG. 8 is an illustrative drawing representing an ensemble of binary decision trees used to classify classroom audio recordings.

Figure 9A:
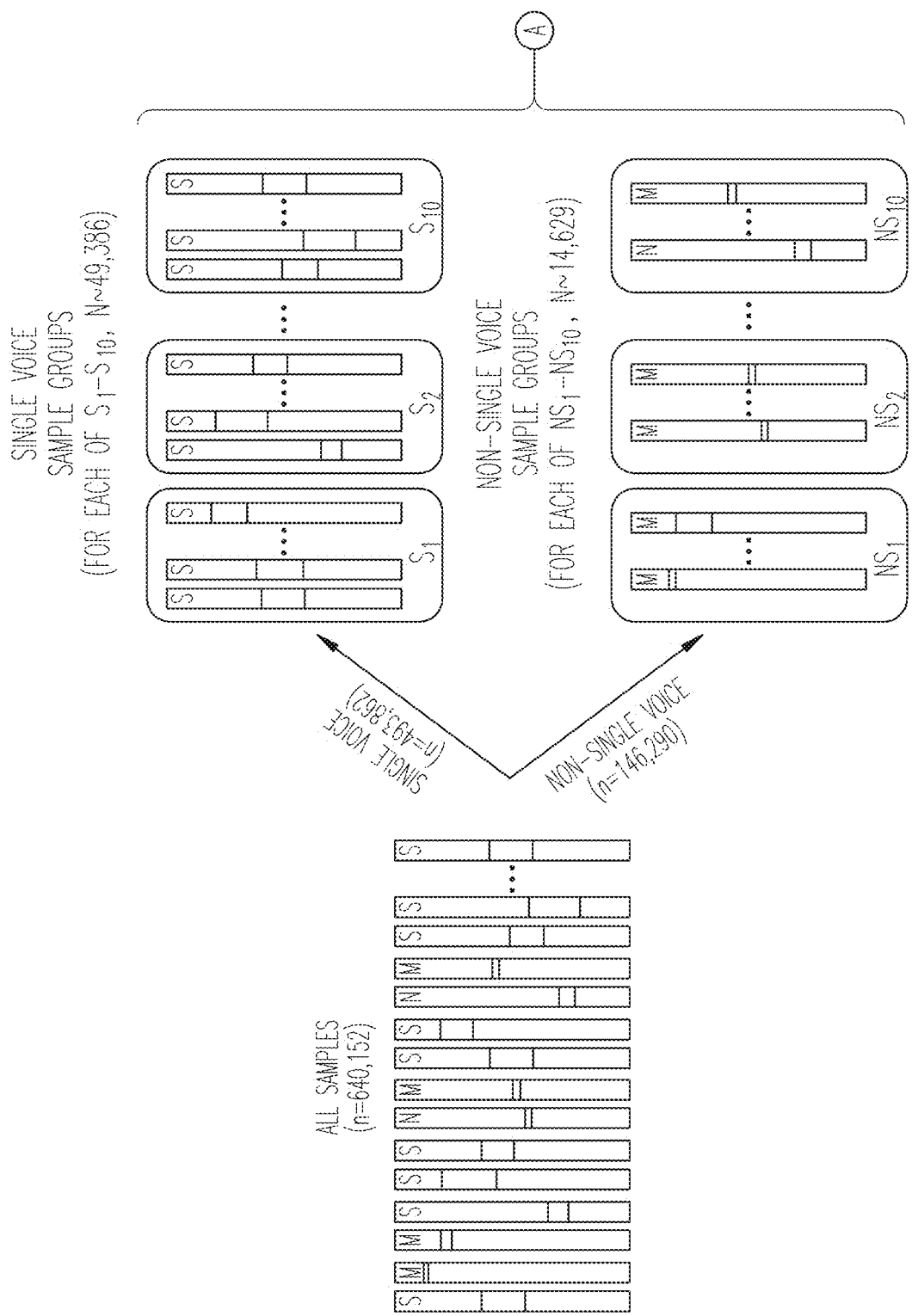
FIGS. 9A-9B are illustrative drawings representing optimizing of parameters for identifying the nature of classroom noise samples using a multi-fold stratified cross-validation with grid search in accordance with some embodiments.
Figure 9B:
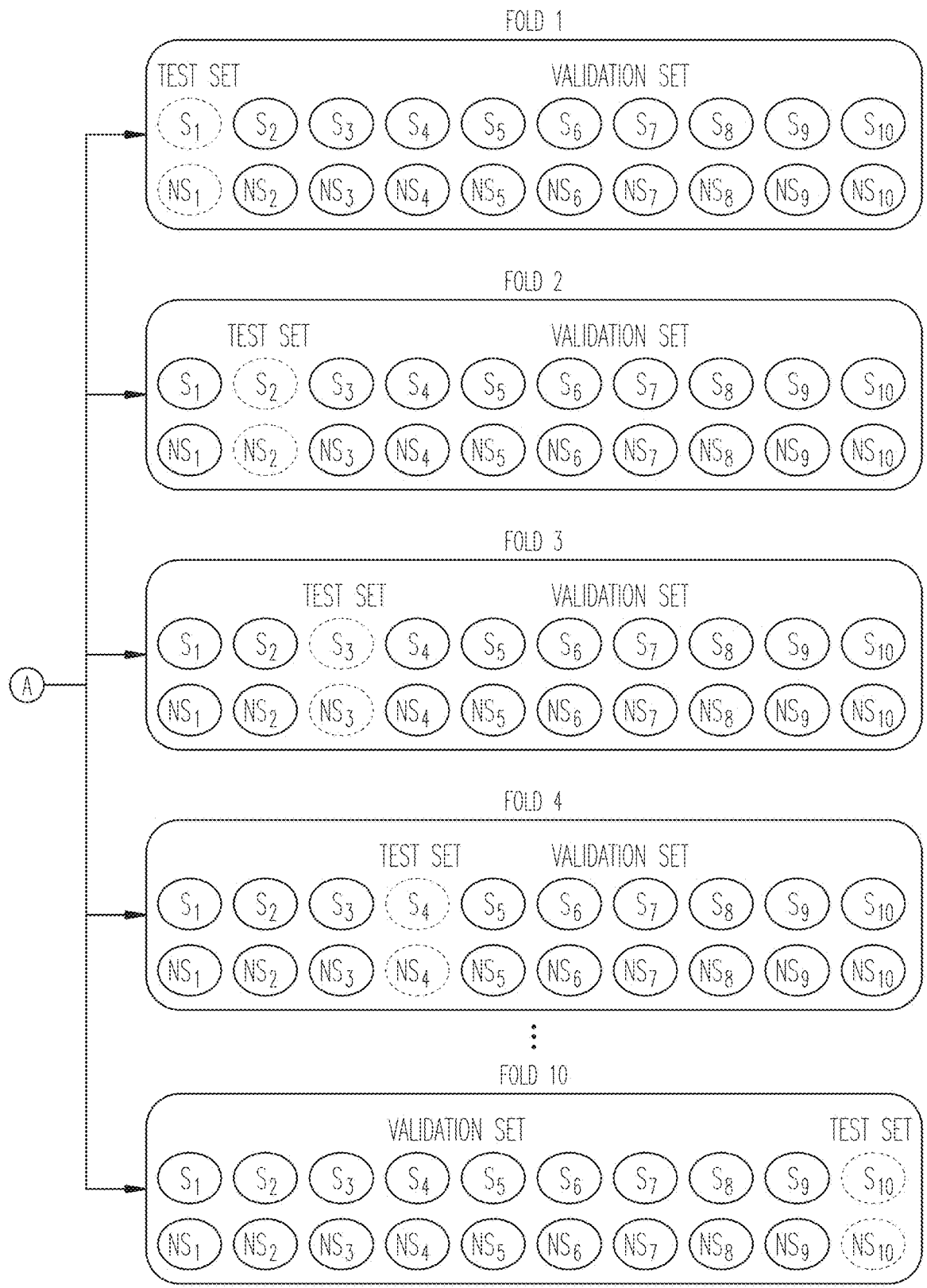

FIGS. 9A-9B are illustrative drawings representing optimizing of parameters for identifying the nature of classroom noise samples using a 10-fold stratified cross-validation with grid search. More specifically, the illustrative example herein shows a process of optimizing parameters for a classifier to samples as Single Voice, although persons skilled in the art will appreciate that a similar process can be used optimizing parameters for a classifier to samples as Multiple Voice or as No Voice.

FIGS. 9A-9B is an illustrative flow diagram showing sorting of samples into (S) Single Voice (n=493,862) and (NS) non-Single Voice (n=146,290) based on human annotation and further randomly and equally divided into 10 groups each ($S_1$-$S_{10}$ and $NS_1$-$NS_{10}$). These groups are recombined 10 times to make 10 folds, each of which contained all the data. Each fold had a different pair of groups (i.e. $S_1/NS_1$ or $S_2/NS_2$) designated as the test set, with all other groups forming the validation set. These folds were all tested using the grid search method that empirically tested all volume and std parameters and measured error for each of these parameter sets.

Figure 10:
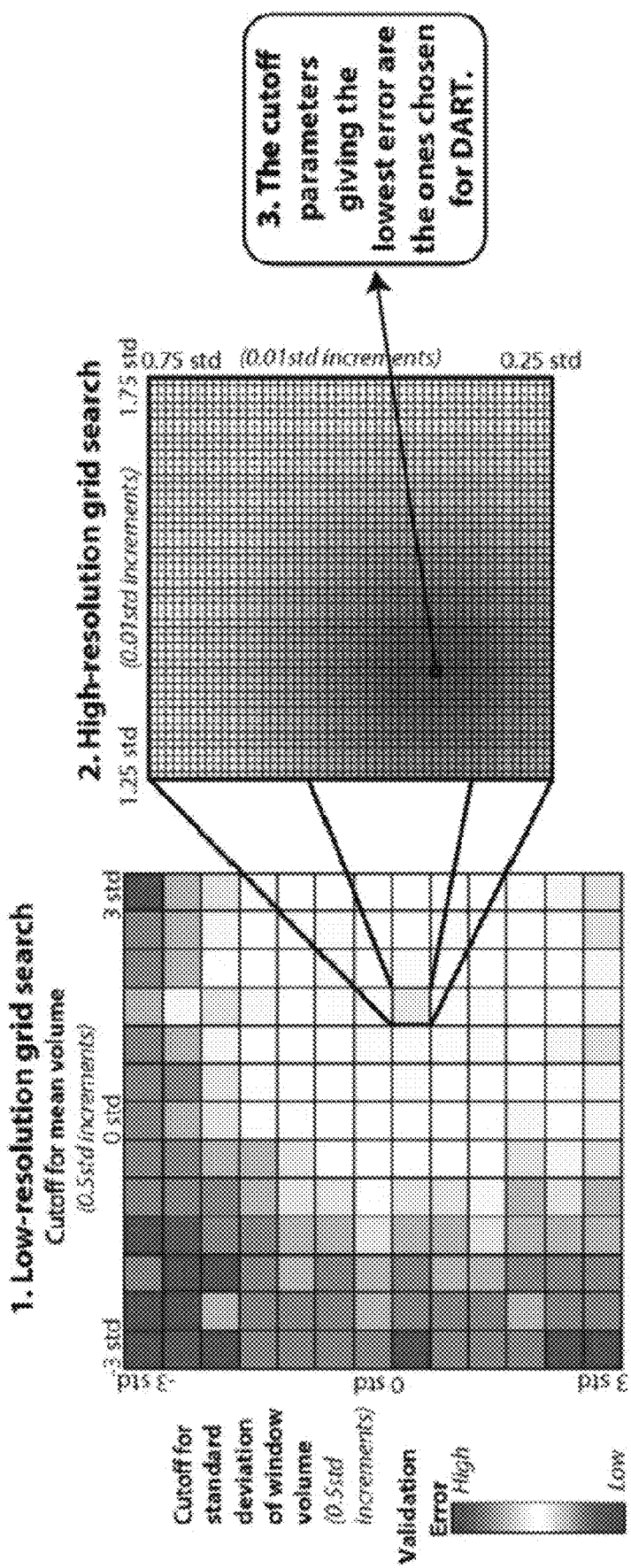
FIG. 10 is an illustrative flow diagram showing a grid search for choosing cutoff parameters for classifying samples as either belonging to a given annotation category or not in accordance with some embodiments.

FIG. 10 is an illustrative flow diagram showing a grid search for choosing cutoff parameters for classifying samples as either belonging to a given annotation category or not. Different combinations of mean volume in window and standard deviation of the window volume may be tried as cutoff parameters on each of the 10 folds. In some experiments, the error rates (percentage of samples where the computer and human annotations did not match) for the validation set and the test set was calculated and represented as heat maps with red showing high validation error and blue showing low validation error for each fold. The parameters were first tested at a low resolution (0.5 std intervals), and the parameters that yielded the lowest validation error were then explored at a higher resolution (0.01 std intervals). The combination of cutoffs for mean volume and mean standard deviation of volume with the lowest average validation error over all folds was selected for the final version of the classification algorithm. A test error was an estimate of generalized model performance.

Experimental Results

The DART approach was able to capture lecture and non-lecture classroom activities. For example, DART predicted a class session that was annotated as 98% lecture with question/answer to be solely Single Voice (FIGS. 6A-6B) and a class session with varied activities like silent writing and discussion to have a variety of modes (FIGS. 6C-6D). DART identification of varied learning activities was robust in both small and large classes (FIGS. 6E-6F). Its predictions revealed the presence of waveform "footprints" indicative of specific teaching techniques (FIGS. 6G1-6G4).

Figure 11A:
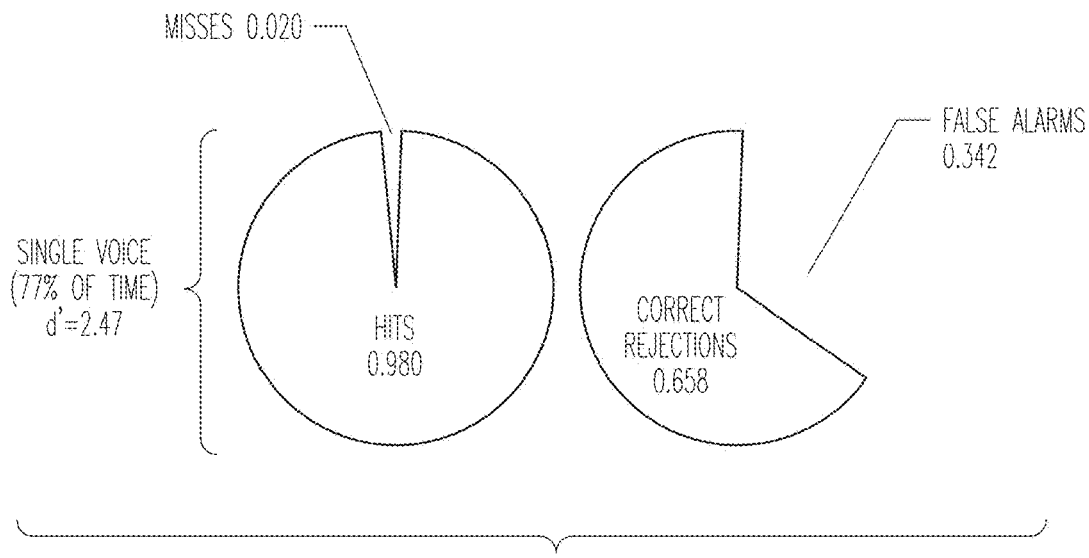
FIGS. 11A-11C are illustrative pie charts representing accuracy of DART in terms of hits, correct rejections, and false alarms for single voice (FIG. 11A), multiple voice (FIG. 11B) and no voice (FIG. 11C).
Figure 11B:
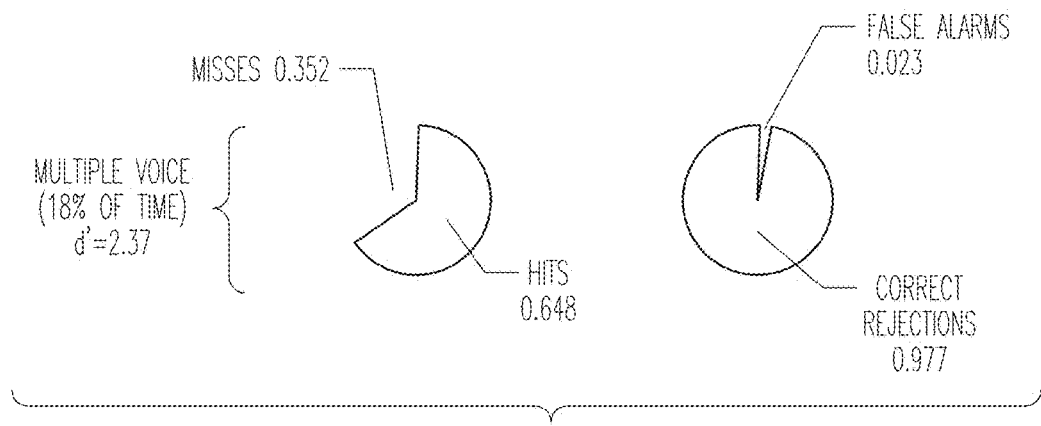
Figure 11C:
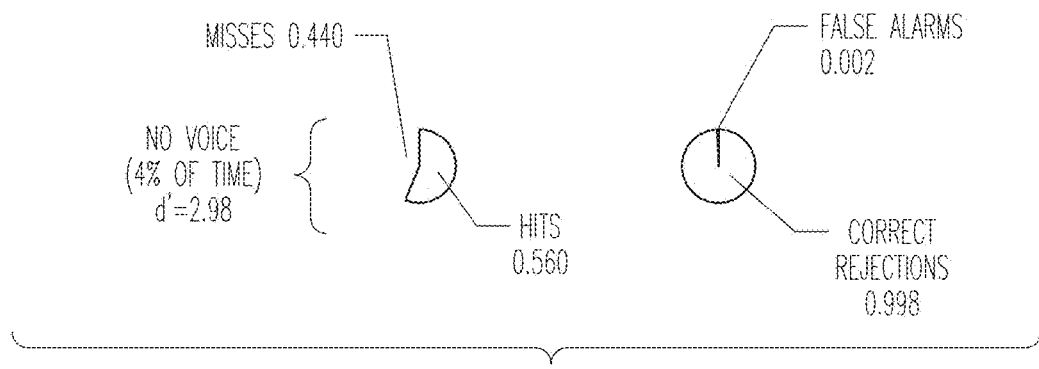
Figure 12A:
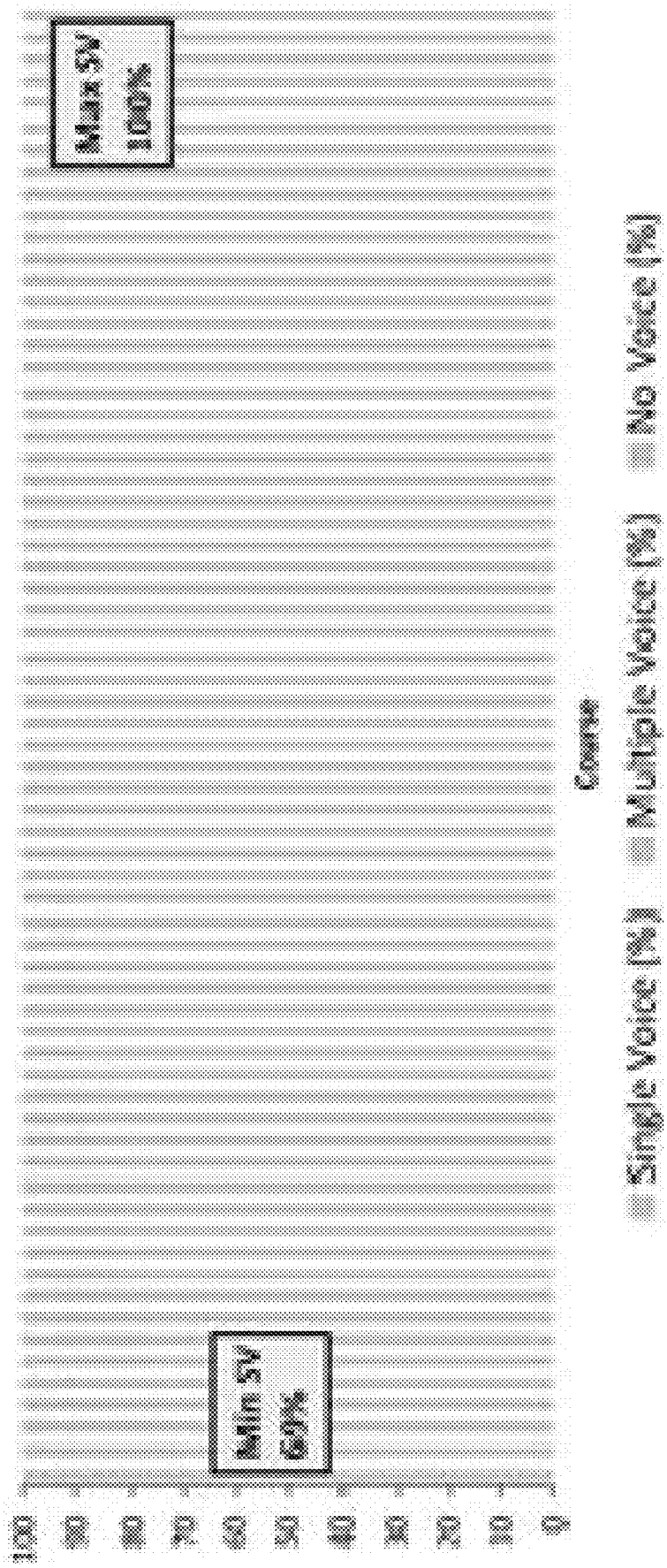
FIGS. 12A-12G depicts an illustrative set of graphs showing results.
Figure 12B:
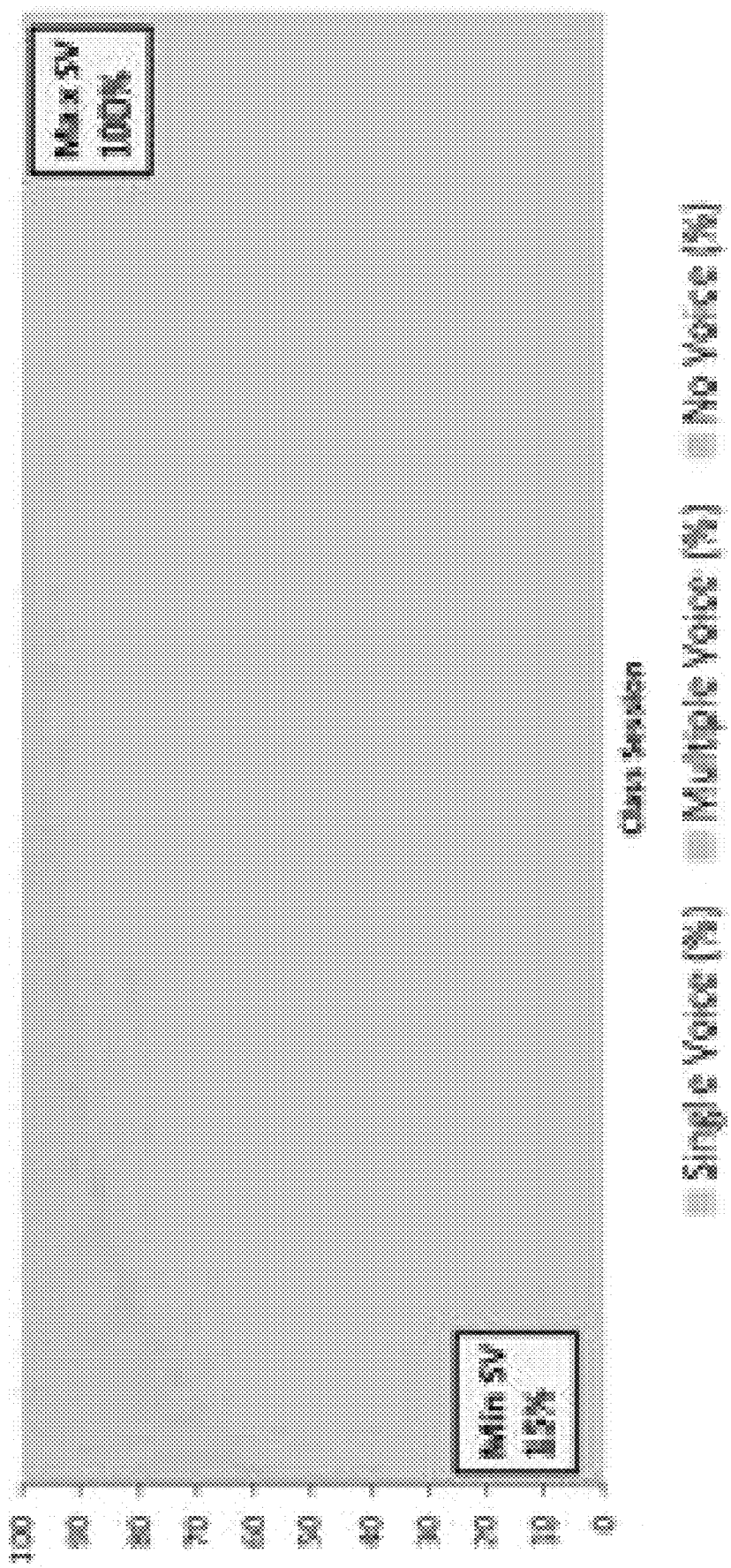
Figure 12C:
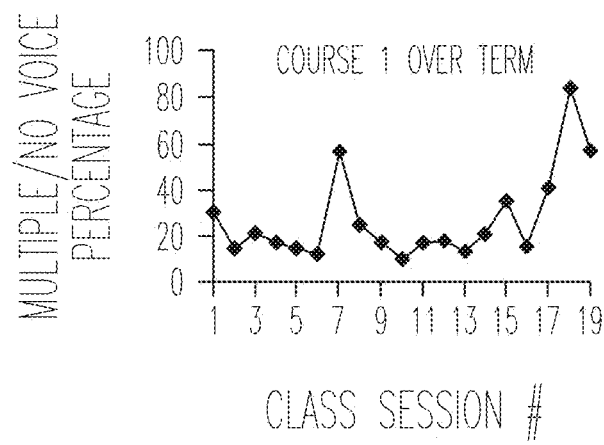
Figure 12D:
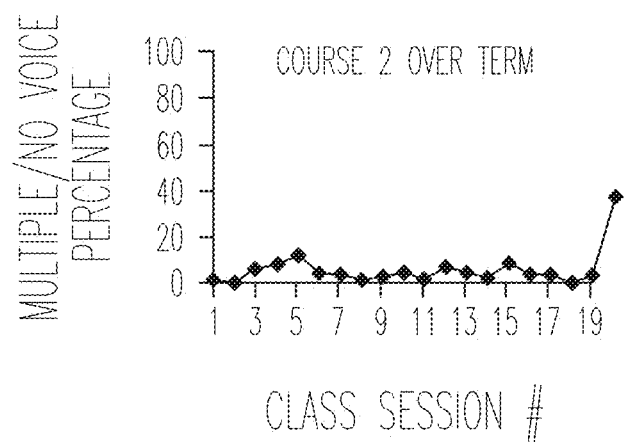
Figure 12G:
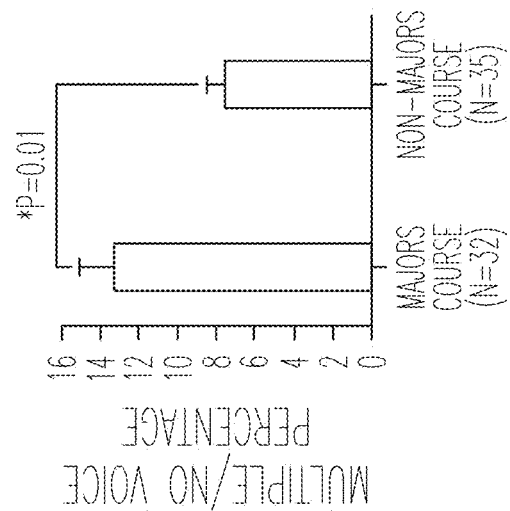
Figure 12H:
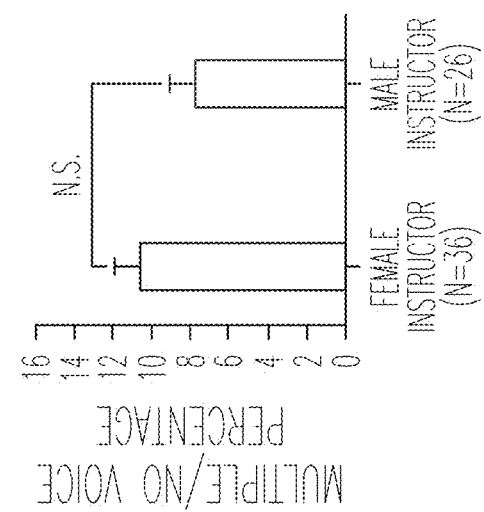
Figure 12E:
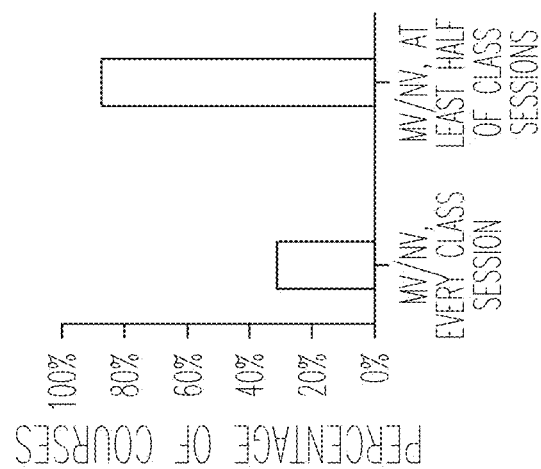

FIGS. 11A-11C indicate that DART accurately identifies Single Voice and conservatively estimates Multiple and No Voice. Pie charts on the left show rates for hits (dark purple) and misses (light purple) and on the right show rates for correct rejections (dark teal) and false alarms (light teal) for each DART mode. Both the number in parentheses and the area of the pie chart represent the proportion of each mode present in human annotations. d' is a measurement of the difference between the signal and noise distributions. (A) Single Voice (B) Multiple Voice (C) No Voice.

FIGS. 12A-12G illustrate that DART can be used to analyze large numbers of courses. (FIG. 12A) Percentage of absolute time spent in Single Voice (SV), Multiple Voice (MV), and No Voice (NV) for all eligible courses (n=67).

Courses ordered in increasing order of Single Voice percentage. Boxes indicate minimum and maximum percentages spent in Single Voice. (FIG. 12B) Percentage of absolute time spent in various modes for all class sessions from eligible courses (n=1486). Class sessions ordered in increasing order of Single Voice. Boxes indicate minimum and maximum percentages spent in Single Voice. (FIGS. 12C-D) Percentage of time spent in Multiple or No Voice in each class session in time order for two representative courses, Course 1 and Course 2. (FIG. 12E) Proportion of courses where all class sessions have some Multiple or No Voice (<100% Single Voice) (left) and where at least half of all class sessions have some Multiple or No Voice (right). (FIG. 12F) Average time spent in Multiple or No Voice for courses with one female (n=36) or male (n=26) instructor. (Co-taught courses excluded.) Error bars represent standard error. n.s.: p=0.10. (FIG. 12G) Average time spent in Multiple or No Voice for majors' (n=32) and Non-majors' (n=35) courses. Error bars represent standard error. *p=0.01.

FIG. 4 depicts an overview of DART Study Participants: Total number of instructors, courses, class sessions, and hours recorded in each group.

DART's usefulness for discerning the presence of activities that may indicate active learning or traditional lecture was assessed using Signal Detection Theory. This method seeks to discriminate for each DART mode (Single Voice, Multiple Voice, and No Voice) between correct inclusions (hits), incorrect exclusions (misses), correct exclusions (correct rejections), and incorrect inclusions (false alarms). DART correctly identifies nearly all instances of lecture and question/answer as Single Voice (hit rate=98.0%) (FIG. 11A). In addition, the false alarm rates for Multiple Voice and No Voice are low (2.3% and <0.1% respectively) (FIGS. 11B-11C). Combined, these rates mean that most errors over—rather than under-estimate lecture, minimizing the potential for falsely indicating the presence of active learning in class sessions. Quantitatively, DART predictions matched the human annotations 90% of the time across all modes.

To explore how DART could be used to analyze classroom audio recordings on a larger scale, we collaborated with 49 instructors to record and analyze 1704 classroom hours, representing 67 courses taught across 15 community colleges and a four-year university (Table 1 of FIG. 13). To verify that this accuracy was maintained in this new data set, one class session from each of the 67 courses was randomly chosen and hand annotated, and we again compared how often the human annotations matched DART's predictions. We obtained an accuracy of 87%. DART analysis revealed that in these courses, a range of instructional strategies were represented. While all courses (n=67) used Single Voice a majority of the time, ranging from 69-100%, among individual class sessions (n=1486), time spent in Single Voice ranged from 15-100% (FIGS. 3A-3B). Within an individual course, the time spent in Single Voice in a class session could vary from 15-90% (FIG. 3C), and some instructors that had no Multiple or No Voice in some class sessions nevertheless spent up to 37% of the time in these categories in another class session (FIG. 3D). This intraclass variability highlights the importance of a tool that can efficiently analyze every class session of a course.

To determine the likelihood a student experienced active learning in any one of these courses, we calculated the percentage of class sessions within each course that included any Multiple or No Voice (<100% Single Voice). While only 31% of the courses had Multiple or No Voice activities in all class sessions, 88% had Multiple or No Voice activities in at least half of their class sessions (FIG. 3D), indicating that many of these instructors are using active learning strategies.

DART also has the potential to reveal differences in how courses are taught across instructors and courses in particular departments or institutions. In this course sample, we found that the percentage of time spent in Multiple- or No-Voice did not vary by instructor gender (n=36 female, n=26 male) (p=0.10) but was significantly higher in courses for majors (n=32) than non-majors (n=35) (p=0.01) (FIGS. 3D-E).

In summary, we have described the development and validation of DART (Decibel Analysis for Research in Teaching), an analytical tool that uses sound levels to predict classroom activities, as well as results from applying DART to 67 STEM courses. We show that DART is robust to varying class sizes and can determine the presence and quantity of Single Voice (e.g., lecture), Multiple Voice (e.g., pair or group discussion), or No Voice (e.g., clicker question, thinking, or quiet writing) learning activities with approximately 90% accuracy. At this level of accuracy, ease of use, and minimal time for analysis, one could analyze and draw broad conclusions about millions of hours of class sessions at periodic intervals over time. Because DART only analyzes sound levels, it protects the anonymity of instructors and students. Furthermore, since DART detected differences in the extent of non-lecture in non-majors' versus majors' biology courses, DART additionally promises to reveal differences among other types of courses, instructors, disciplines, and institutions that were previously not feasible for study.

Computer System Embodiment

Figure 14:
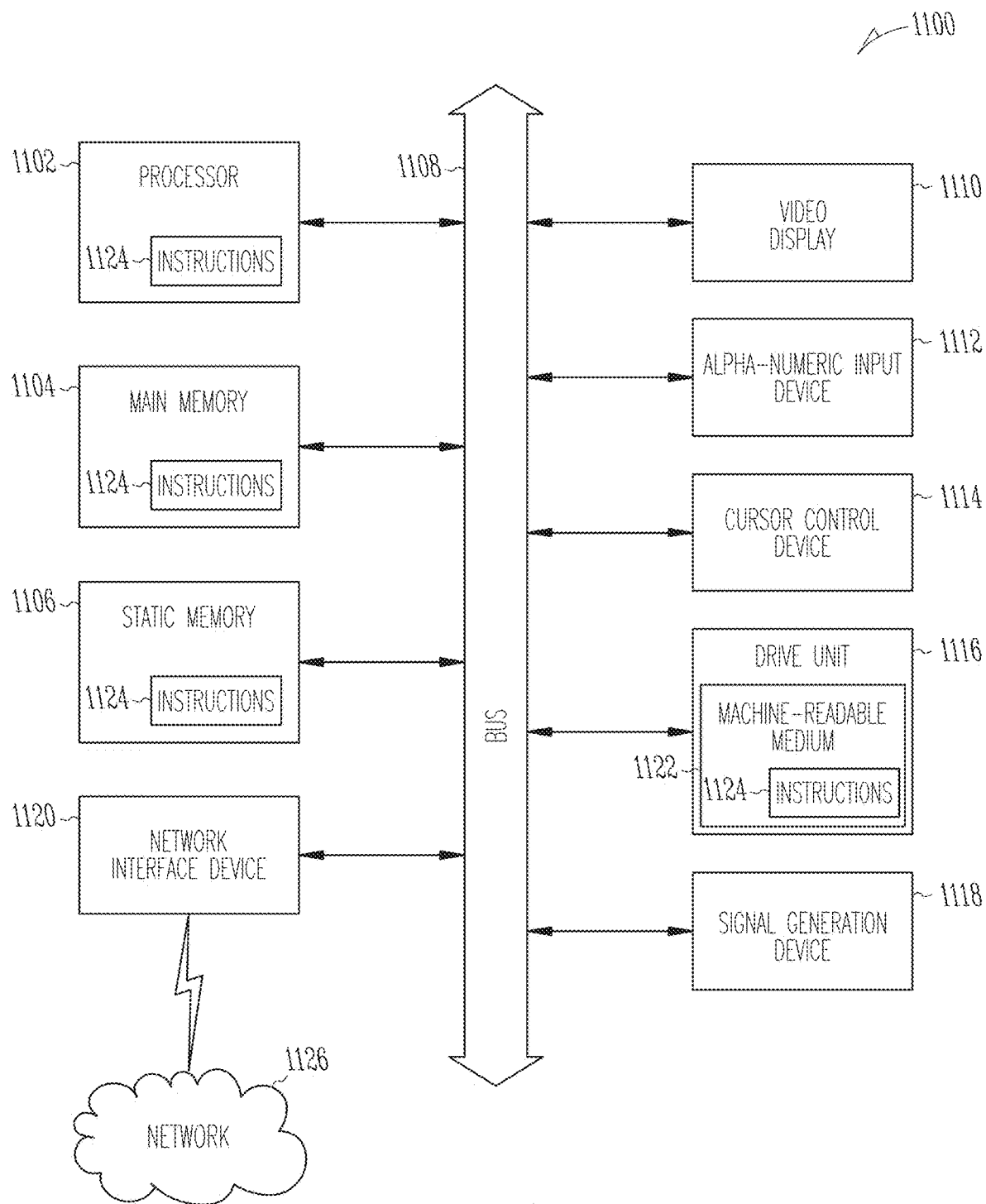
FIG. 14 is an illustrative block diagram of a computer system to implement the system of FIG. 1.

FIG. 14 is an illustrative block diagram of a computer system 1100. The computer system, or variations thereof, may be configured to act as system to classify sounds in accordance with DART. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment, for example. In a networked deployment, the computer may operate in the capacity of a server or a client computer in a server-client network environment, or as a peer computer in a peer-to-peer (or distributed) network environment, for example.

The example computer system 1100 includes a hardware processor 1122 (e.g., a central processing unit (CPU), a graphics processing unit (GPU) or both), main memory 1104 and static memory 1106, which communicate with each other via bus 1108. The computer system 1100 may further include video display unit 1120 (e.g., a plasma display, a liquid crystal display (LCD) or a cathode ray tube (CRT)). The computer system 1100 also includes alphanumeric input device 1122 (e.g., a keyboard), a user interface (UI) navigation device 1114 (e.g., a mouse, touch screen, or the like), an SSD or disk drive unit 1116, a signal generation device 1118 (e.g., a speaker), and a network interface device 1120.

The DRAM, SSD or disk drive unit 1126, which can act as a storage memory device, includes computer-readable storage device 1122 on which is stored one or more sets of instructions and data structures (e.g., software 1124) embodying or utilized by any one or more of the methodologies or functions described herein. The software 1124 may also reside, completely or at least partially, within a computer readable storage device such as the main memory 1104 and/or within the processor 1122 during execution thereof by the computer system 1100, the main memory 1104 and the processor 1122 also constituting non-transitory computer-readable media. The memory devices 212, 414 and 516 may be implemented within the DRAM, SSD or disk drive unit 1126, for example. Moreover, the single speaker classifier 110, multiple speaker classifier 112, and no speaker classifier 114 may be stored in the DRAM, SSD or disk drive unit 1126 or in an external server 120 as explained above. The software 1124 may further be transmitted or received over network 1126 via a network interface device 1120 utilizing any one of a number of well-known transfer protocols (e.g., HTTP). The storage memory device 1126 can be configured to store the single voice, multiple voice and no voice classifiers 110, 112, 114.

The foregoing description and drawings of embodiments in accordance with the present invention are merely illustrative of the principles of the invention. Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the disclosure should be limited only by the following claims, and it is appropriate that the claims be construed broadly and in a manner consistent with the scope of the embodiments disclosed herein. The above description is presented to enable any person skilled in the art to create and use a system and method to determine teaching technique based upon sound amplitude. Various modifications to the embodiments will be readily apparent to those skilled in the art, and the generic principles defined herein may be applied to other embodiments and applications without departing from the spirit and scope of the invention. In the preceding description, numerous details are set forth for the purpose of explanation. However, one of ordinary skill in the art will realize that the invention might be practiced without the use of these specific details. In other instances, well-known processes are shown in block diagram form in order not to obscure the description of the invention with unnecessary detail. Identical reference numerals may be used to represent different views of the same or similar item in different drawings. Thus, the foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

What is claimed is:

1. A system to determine teaching technique based upon sound amplitude comprising:
    a processor; and
    a memory device holding an instruction set executable on the processor to cause the computer system to perform operations comprising:
    storing in a storage memory device, a sequence of detected sound amplitude values representing sound amplitude emanating from a learning session during a corresponding sequence of time intervals;
    producing a sequence of respective sound samples corresponding to the sequence of detected amplitude values by,
    determining respective normalized sound amplitude values based upon respective detected sound amplitude values corresponding to respective time intervals within respective time windows, each respective time window having a prescribed number of time intervals and each respective time window encompassing a different collection of successive time intervals from the sequence of time intervals, and
    determining respective variation values corresponding respective sound amplitude values based upon respective sound amplitude values corresponding to respective time intervals within respective time windows; and
    classifying respective sound samples of the sequence of sound samples based upon the respective normalized stored amplitudes and the respective variation values of stored amplitude values.

2. The system of claim 1,
    wherein determining respective normalized sound amplitude values based upon respective detected sound amplitude values corresponding to respective time intervals within respective time windows includes averaging respective detected sound amplitude values corresponding to respective time intervals within respective time windows.

3. The system of claim 1,
    wherein determining respective normalized sound amplitude values based upon respective detected sound amplitude values corresponding to respective time intervals within respective time windows includes summing respective detected sound amplitude values corresponding to respective time intervals within respective time windows.

4. The system of claim 1,
    wherein determining respective variation values corresponding to respective sound amplitude values corresponding to respective time intervals within respective time windows includes determining, based upon the detected sound amplitude values.

5. The system of claim 1,
    wherein determining respective variation values corresponding to respective sound amplitude values corresponding to respective time intervals within respective time windows includes determining, based upon the normalized sound amplitude values.

6. The system of claim 1,
    wherein determining respective variation values corresponding to respective sound amplitude values corresponding to respective time intervals within respective time windows includes determining respective standard deviation values.

7. The system of claim 1 further including:
    associating in a storage memory device, respective normalized sound amplitude values and respective variation values corresponding to respective sound amplitude values that correspond to respective common time intervals within respective common time windows.

8. The system of claim 1 further including:
    a transducer to detect sound amplitude and to convert the sound amplitude and to an electrical signal having a value representing the detected sound amplitude.

9. The system of claim 1,
    wherein storing includes storing at a sampling rate slow enough to not record details human speech.

10. The system of claim 1,
    wherein the memory device the instruction set executable on the processor to further cause the computer system to perform operations comprising:
    cutting out a range of detected sound amplitude values at a beginning and of a sequence of detected sound amplitude values and at an end of the sequence of detected sound amplitude values.

11. The system of claim 1,
wherein the memory device the instruction set executable on the processor to further cause the computer system to perform operations comprising:
normalizing respective detected sound amplitude values across a portion of a sample session that includes multiple respective time windows.

12. The system of claim 1,
wherein the memory device the instruction set executable on the processor to further cause the computer system to perform operations comprising:
normalizing sample variation across a portion of a sample session that includes multiple respective time windows.

13. The system of claim 1
wherein classifying the sound samples includes determining whether a respective sample has a combination of an assigned amplitude value and an assigned amplitude variation value that matches one of single voice classification parameter values, multiple voice parameter values, and no voice parameter values.

14. The system of claim 1,
wherein classifying the sound samples includes first determining whether a respective sample has a combination of an assigned amplitude value and an assigned amplitude variation value that matches a single voice classification parameter values; and
in response to determining that the respective sample has a combination of an assigned amplitude value and an assigned amplitude variation value that does not match a single voice classification parameter values, determining whether the respective sample has a combination of an assigned amplitude value and an assigned amplitude variation value that one of multiple voice parameter values and no voice parameter values.

15. The system of claim 1,
wherein the memory device the instruction set executable on the processor to further cause the computer system to perform operations comprising:
storing a single voice classification look up table;
storing a multiple voice classification look up table; and
storing a no voice classification look up table;
wherein classifying the sound samples based upon the assigned sound amplitude and sound sample variation includes comparing combinations of assigned sound amplitude and assigned sound variation with combinations of amplitude and variation stored in at least one of the single voice classification table, the multiple voice classification table, and the no voice classification table.

16. The system of claim 1 further including:
a display screen configured to display a chart indicating classification of samples within a sampling sequence.

17. A system to determine teaching technique based upon sound amplitude comprising:
means for producing a sequence of respective sound samples corresponding to the sequence of detected amplitude values by,
determining respective normalized sound amplitude values based upon respective detected sound amplitude values corresponding to respective time intervals within respective time windows, each respective time window having a prescribed number of time intervals and each respective time window encompassing a different collection of successive time intervals from the sequence of time intervals, and
determining respective variation values corresponding respective sound amplitude values based upon respective sound amplitude values corresponding to respective time intervals within respective time windows; and
means for classifying respective sound samples of the sequence of sound samples based upon the respective normalized stored amplitudes and the respective variation values of stored amplitude values.

18. The system of claim 17,
wherein the means for classifying includes,
a single voice classification look up table;
a multiple voice classification look up tables; and
a no voice classification look up table.

19. The system of claim 17 further including:
means for cutting out a range of detected sound amplitude values at a beginning and of a sample sequence at an end of the sample sequence.

20. The system of claim 17 further including:
means for normalizing respective detected amplitude values across a portion of a sample session that includes multiple respective time windows.

21. A method to determine learning technique used within a learning session setting based upon sound amplitude, while protecting anonymity of instructors and students comprising:
detecting sound amplification sample values from electrical signals at a sampling rate that is low enough to anonymize the sound represented by the detected sound amplification sample values;
producing a sequence of respective sound samples corresponding to the sequence of detected amplitude values by,
determining respective normalized sound amplitude values based upon respective detected sound amplitude values corresponding to respective time intervals within respective time windows, each respective time window having a prescribed number of time intervals and each respective time window encompassing a different collection of successive time intervals from the sequence of time intervals, and
determining respective variation values corresponding respective sound amplitude values based upon respective sound amplitude values corresponding to respective time intervals within respective time windows; and
classifying respective sound samples of the sequence of sound samples based upon the respective normalized stored amplitudes and the respective variation values of stored amplitude values.

22. The method of claim 21,
wherein classifying the sound samples includes determining whether a respective sample has a combination of an assigned amplitude value and an assigned amplitude variation value that matches one of single voice classification parameter values, multiple voice parameter values, and no voice parameter values.

23. The method of claim 21,
wherein classifying the sound samples includes first determining whether a respective sample has a combination of an assigned amplitude value and an assigned amplitude variation value that matches a single voice classification parameter values; and
in response to determining that the respective sample has a combination of an assigned amplitude value and an assigned amplitude variation value that does not match a single voice classification parameter values, determining whether the respective sample has a combination of an assigned amplitude value and an assigned amplitude variation value that one of multiple voice parameter values and no voice parameter values.

24. The method of claim 21 further including:
storing a single voice classification look up table;
storing a multiple voice classification look up table; and
storing a no voice classification look up table;
wherein classifying the sound samples based upon the assigned sound amplitude and sound sample variation includes comparing combinations of assigned sound amplitude and assigned sound variation with combinations of amplitude and variation stored in at least one of the single voice classification table, the multiple voice classification table, and the no voice classification table.

25. A non-transitory machine-readable medium storing executable instructions thereon, which, when executed by a processor, cause the processor to perform operations including:
detecting sound amplification sample values from electrical signals, produced by a sound transducer, at a sampling rate that is low enough to anonymize sound represented by the detected sound amplification sample values;
producing a sequence of respective sound samples corresponding to the sequence of detected amplitude values by,
determining respective normalized sound amplitude values based upon respective detected sound amplitude values corresponding to respective time intervals within respective time windows, each respective time window having a prescribed number of time intervals and each respective time window encompassing a different collection of successive time intervals from the sequence of time intervals, and
determining respective variation values corresponding respective sound amplitude values based upon respective sound amplitude values corresponding to respective time intervals within respective time windows; and
classifying respective sound samples of the sequence of sound samples based upon the respective normalized stored amplitudes and the respective variation values of stored amplitude values.

26. The method of claim 21,
wherein detecting includes storing at a sampling rate that is low enough so that individual voices cannot be recognized based upon the samples.

27. The method of claim 21,
wherein detecting includes storing at a sampling rate that is low enough so that individual words cannot be recognized based upon the samples.

28. The method of claim 21,
wherein detecting includes storing at a sampling rate that is 2 Hz.

29. The method of claim 21 further including:
converting by a sound transducer, sounds emanating from the learning session to produce the electrical signals, wherein the electrical signals have amplitude values indicative of sound amplitude during the session.

30. The method of claim 21 further including:
displaying on a display screen a chart indicating classification of samples within a sampling sequence.

31. The method of claim 21 further including:
displaying on a display screen one or more charts display segments indicating example sample activity footprints from different class sessions.

32. The method of claim 25,
wherein detecting includes storing at a sampling rate that is low enough so that individual voices cannot be recognized based upon the samples.

33. The method of claim 25,
wherein detecting includes storing at a sampling rate that is low enough so that individual words cannot be recognized based upon the samples.

34. The method of claim 25,
wherein detecting includes storing at a sampling rate that is 2 Hz.

35. The non-transitory machine-readable medium of claim 25, the operations further including:
displaying on a display screen one or more chart display segments indicating example sample activity footprints from different class sessions.

36. The non-transitory machine-readable medium of claim 25, the operations further including:
displaying on a display screen one or more charts display segments indicating example sample activity footprints from different class sessions.

* * * * *